United States Patent
Byers et al.

(10) Patent No.: US 11,716,288 B2
(45) Date of Patent: Aug. 1, 2023

(54) ORCHESTRATION SYSTEM FOR MIGRATING USER DATA AND SERVICES BASED ON USER INFORMATION

(71) Applicant: Cisco Technology, Inc., San Jose, CA (US)

(72) Inventors: Charles Calvin Byers, Wheaton, IL (US); Gonzalo Salgueiro, Raleigh, NC (US); Joseph Michael Clarke, Raleigh, NC (US); Chidambaram Arunachalam, Cary, NC (US); Nagendra Kumar Nainar, Morrisville, NC (US); Avraham Poupko, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 18 days.

(21) Appl. No.: 16/730,522

(22) Filed: Dec. 30, 2019

(65) Prior Publication Data

US 2020/0145348 A1 May 7, 2020

Related U.S. Application Data

(63) Continuation of application No. 15/289,755, filed on Oct. 10, 2016, now Pat. No. 10,523,592.

(51) Int. Cl.
*H04L 47/80* (2022.01)
*H04L 47/70* (2022.01)
*G06F 16/11* (2019.01)

(52) U.S. Cl.
CPC .......... *H04L 47/823* (2013.01); *G06F 16/119* (2019.01); *H04L 47/80* (2013.01)

(58) Field of Classification Search
CPC .. G06F 17/30079; G06F 16/119; H04L 47/80; H04L 47/823
See application file for complete search history.

(56) References Cited

U.S. PATENT DOCUMENTS

| 5,812,773 A | 9/1998 | Norin |
|---|---|---|
| 5,889,896 A | 3/1999 | Meshinsky et al. |

(Continued)

FOREIGN PATENT DOCUMENTS

| CN | 101719930 | 6/2010 |
|---|---|---|
| CN | 101394360 | 7/2011 |

(Continued)

OTHER PUBLICATIONS

Amedro, Brian, et al., "An Efficient Framework for Running Applications on Clusters, Grids and Cloud," 2010, 17 pages.

(Continued)

*Primary Examiner* — William G Trost, IV
*Assistant Examiner* — Adam A Cooney
(74) *Attorney, Agent, or Firm* — Polsinelli PC

(57) ABSTRACT

Systems, methods, and computer-readable media for orchestrating data center resources and user access to data. In some examples, a system can determine, at a first time, that a user will need, at a second time, access to data stored at a first location, from a second location. The system can identify a node which is capable of storing the data and accessible by a device from the second location. The system can also determine a first service parameter associated with a network connection between the device and the first location and a second service parameter associated with a network connection between the device and the node. When the second service parameter has a higher quality than the first service parameter, the system can migrate the data from the first location to the node so the device has access to the data from the second location through the node.

20 Claims, 9 Drawing Sheets

(56) References Cited

U.S. PATENT DOCUMENTS

| | | | |
|---|---|---|---|
| 6,108,782 A | 8/2000 | Fletcher et al. | |
| 6,178,453 B1 | 1/2001 | Mattaway et al. | |
| 6,298,153 B1 | 10/2001 | Oishi | |
| 6,343,290 B1 | 1/2002 | Cossins et al. | |
| 6,643,260 B1 | 11/2003 | Kloth et al. | |
| 6,683,873 B1 | 1/2004 | Kwok et al. | |
| 6,721,804 B1 | 4/2004 | Rubin et al. | |
| 6,733,449 B1 | 5/2004 | Krishnamurthy et al. | |
| 6,735,631 B1 | 5/2004 | Oehrke et al. | |
| 6,996,615 B1 | 2/2006 | McGuire | |
| 7,054,930 B1 | 5/2006 | Cheriton | |
| 7,058,706 B1 | 6/2006 | Iyer et al. | |
| 7,062,571 B1 | 6/2006 | Dale et al. | |
| 7,111,177 B1 | 9/2006 | Chauvel et al. | |
| 7,167,965 B2* | 1/2007 | Alvarez | G06F 11/3433 714/E11.2 |
| 7,212,490 B1 | 5/2007 | Kao et al. | |
| 7,277,948 B2 | 10/2007 | Igarashi et al. | |
| 7,313,667 B1 | 12/2007 | Pullela et al. | |
| 7,379,846 B1 | 5/2008 | Williams et al. | |
| 7,480,672 B2 | 1/2009 | Hahn et al. | |
| 7,496,043 B1 | 2/2009 | Leong et al. | |
| 7,536,476 B1 | 5/2009 | Alleyne | |
| 7,567,504 B2 | 7/2009 | Darling et al. | |
| 7,606,147 B2 | 10/2009 | Luft et al. | |
| 7,647,594 B2 | 1/2010 | Togawa | |
| 7,773,510 B2 | 8/2010 | Back et al. | |
| 7,808,897 B1 | 10/2010 | Mehta et al. | |
| 7,881,957 B1 | 2/2011 | Cohen et al. | |
| 7,917,647 B2 | 3/2011 | Cooper et al. | |
| 8,010,598 B2 | 8/2011 | Tanimoto | |
| 8,028,071 B1 | 9/2011 | Mahalingam et al. | |
| 8,041,714 B2 | 10/2011 | Aymeloglu et al. | |
| 8,121,117 B1 | 2/2012 | Amdahl et al. | |
| 8,171,415 B2 | 5/2012 | Appleyard et al. | |
| 8,234,377 B2 | 7/2012 | Cohn | |
| 8,244,559 B2 | 8/2012 | Horvitz et al. | |
| 8,250,215 B2 | 8/2012 | Stienhans et al. | |
| 8,280,880 B1 | 10/2012 | Aymeloglu et al. | |
| 8,284,664 B1 | 10/2012 | Aybay et al. | |
| 8,301,746 B2 | 10/2012 | Head et al. | |
| 8,345,692 B2 | 1/2013 | Smith | |
| 8,406,141 B1 | 3/2013 | Couturier et al. | |
| 8,407,413 B1 | 3/2013 | Yucel et al. | |
| 8,448,171 B2 | 5/2013 | Donnellan et al. | |
| 8,477,610 B2 | 7/2013 | Zuo et al. | |
| 8,495,356 B2 | 7/2013 | Ashok et al. | |
| 8,510,469 B2 | 8/2013 | Portolani | |
| 8,514,868 B2 | 8/2013 | Hill | |
| 8,532,108 B2 | 9/2013 | Li et al. | |
| 8,533,687 B1 | 9/2013 | Greifeneder et al. | |
| 8,547,974 B1 | 10/2013 | Guruswamy et al. | |
| 8,560,639 B2 | 10/2013 | Murphy et al. | |
| 8,560,663 B2 | 10/2013 | Baucke et al. | |
| 8,589,543 B2 | 11/2013 | Dutta et al. | |
| 8,590,050 B2 | 11/2013 | Nagpal et al. | |
| 8,611,356 B2 | 12/2013 | Yu et al. | |
| 8,612,625 B2 | 12/2013 | Andreis et al. | |
| 8,630,291 B2 | 1/2014 | Shaffer et al. | |
| 8,639,787 B2 | 1/2014 | Lagergren et al. | |
| 8,656,024 B2 | 2/2014 | Krishnan et al. | |
| 8,660,129 B1 | 2/2014 | Brendel et al. | |
| 8,719,804 B2 | 5/2014 | Jain | |
| 8,775,576 B2 | 7/2014 | Hebert et al. | |
| 8,797,867 B1 | 8/2014 | Chen et al. | |
| 8,805,951 B1 | 8/2014 | Faibish et al. | |
| 8,812,490 B1* | 8/2014 | Cappiello | G06F 16/24537 707/718 |
| 8,850,182 B1 | 9/2014 | Fritz et al. | |
| 8,856,339 B2 | 10/2014 | Mestery et al. | |
| 8,909,928 B2 | 12/2014 | Ahmad et al. | |
| 8,918,510 B2 | 12/2014 | Gmach et al. | |
| 8,924,720 B2 | 12/2014 | Raghuram et al. | |
| 8,930,747 B2 | 1/2015 | Levijarvi et al. | |
| 8,938,775 B1 | 1/2015 | Roth et al. | |
| 8,959,526 B2 | 2/2015 | Kansal et al. | |
| 8,977,754 B2 | 3/2015 | Curry, Jr. et al. | |
| 9,009,697 B2 | 4/2015 | Breiter et al. | |
| 9,015,324 B2 | 4/2015 | Jackson | |
| 9,043,439 B2 | 5/2015 | Bicket et al. | |
| 9,049,115 B2 | 6/2015 | Rajendran et al. | |
| 9,063,789 B2 | 6/2015 | Beaty et al. | |
| 9,065,727 B1 | 6/2015 | Liu et al. | |
| 9,075,649 B1 | 7/2015 | Bushman et al. | |
| 9,164,795 B1 | 10/2015 | Vincent | |
| 9,167,050 B2 | 10/2015 | Durazzo et al. | |
| 9,201,701 B2 | 12/2015 | Boldyrev et al. | |
| 9,201,704 B2 | 12/2015 | Chang et al. | |
| 9,203,784 B2 | 12/2015 | Chang et al. | |
| 9,223,634 B2 | 12/2015 | Chang et al. | |
| 9,244,776 B2 | 1/2016 | Koza et al. | |
| 9,251,114 B1 | 2/2016 | Ancin et al. | |
| 9,264,478 B2 | 2/2016 | Hon et al. | |
| 9,268,789 B1* | 2/2016 | Swerdlow | G06F 16/1827 |
| 9,313,048 B2 | 4/2016 | Chang et al. | |
| 9,338,599 B1 | 5/2016 | Burgmeier et al. | |
| 9,361,192 B2 | 6/2016 | Smith et al. | |
| 9,380,075 B2 | 6/2016 | He et al. | |
| 9,432,294 B1 | 8/2016 | Sharma et al. | |
| 9,444,744 B1 | 9/2016 | Sharma et al. | |
| 9,473,365 B2 | 10/2016 | Melander et al. | |
| 9,503,530 B1 | 11/2016 | Niedzielski | |
| 9,558,078 B2 | 1/2017 | Farlee et al. | |
| 9,613,078 B2 | 4/2017 | Vermeulen et al. | |
| 9,628,471 B1 | 4/2017 | Sundaram et al. | |
| 9,658,876 B2 | 5/2017 | Chang et al. | |
| 9,692,802 B2 | 6/2017 | Bicket et al. | |
| 9,755,858 B2 | 9/2017 | Bagepalli et al. | |
| 2002/0073337 A1 | 6/2002 | Ioele et al. | |
| 2002/0143928 A1 | 10/2002 | Maltz et al. | |
| 2002/0166117 A1 | 11/2002 | Abrams et al. | |
| 2002/0174216 A1 | 11/2002 | Shorey et al. | |
| 2003/0018591 A1 | 1/2003 | Komisky | |
| 2003/0056001 A1 | 3/2003 | Mate et al. | |
| 2003/0228585 A1 | 12/2003 | Inoko et al. | |
| 2004/0004941 A1 | 1/2004 | Malan et al. | |
| 2004/0095237 A1 | 5/2004 | Chen et al. | |
| 2004/0131059 A1 | 7/2004 | Ayyakad et al. | |
| 2004/0264481 A1 | 12/2004 | Darling et al. | |
| 2005/0060418 A1 | 3/2005 | Sorokopud | |
| 2005/0125424 A1 | 6/2005 | Herriott et al. | |
| 2006/0104286 A1 | 5/2006 | Cheriton | |
| 2006/0126665 A1 | 6/2006 | Ward et al. | |
| 2006/0146825 A1 | 7/2006 | Hofstaedter et al. | |
| 2006/0155875 A1 | 7/2006 | Cheriton | |
| 2006/0168338 A1 | 7/2006 | Bruegl et al. | |
| 2007/0174663 A1 | 7/2007 | Crawford et al. | |
| 2007/0223487 A1 | 9/2007 | Kajekar et al. | |
| 2007/0242830 A1 | 10/2007 | Conrado et al. | |
| 2008/0005293 A1 | 1/2008 | Bhargava et al. | |
| 2008/0084880 A1 | 4/2008 | Dharwadkar | |
| 2008/0165778 A1 | 7/2008 | Ertemalp | |
| 2008/0198752 A1 | 8/2008 | Fan et al. | |
| 2008/0201711 A1 | 8/2008 | Amir Husain | |
| 2008/0235755 A1 | 9/2008 | Blaisdell et al. | |
| 2009/0006527 A1 | 1/2009 | Gingell, Jr. et al. | |
| 2009/0019367 A1 | 1/2009 | Cavagnari et al. | |
| 2009/0031312 A1 | 1/2009 | Mausolf et al. | |
| 2009/0083183 A1 | 3/2009 | Rao et al. | |
| 2009/0138763 A1 | 5/2009 | Arnold | |
| 2009/0177775 A1 | 7/2009 | Radia et al. | |
| 2009/0178058 A1 | 7/2009 | Stillwell, III et al. | |
| 2009/0182874 A1 | 7/2009 | Morford et al. | |
| 2009/0265468 A1 | 10/2009 | Annambhotla et al. | |
| 2009/0265753 A1 | 10/2009 | Anderson et al. | |
| 2009/0291696 A1* | 11/2009 | Cortes | H04L 67/5682 455/466 |
| 2009/0293056 A1 | 11/2009 | Ferris | |
| 2009/0300608 A1 | 12/2009 | Ferris et al. | |
| 2009/0313562 A1 | 12/2009 | Appleyard et al. | |
| 2009/0323706 A1 | 12/2009 | Germain et al. | |
| 2009/0328031 A1 | 12/2009 | Pouyadou et al. | |
| 2010/0042720 A1 | 2/2010 | Stienhans et al. | |
| 2010/0061250 A1 | 3/2010 | Nugent | |

(56) References Cited

U.S. PATENT DOCUMENTS

| | | |
|---|---|---|
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0110044 A1* | 5/2012 | Nagpal .................. G06F 16/27 707/827 |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0036217 A1* | 2/2013 | DeJana .................. G06F 9/5072 709/224 |
| 2013/0044636 A1 | 2/2013 | Koponen et al. |
| 2013/0066940 A1 | 3/2013 | Shao |
| 2013/0073670 A1* | 3/2013 | Das ....................... H04L 67/30 709/217 |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1* | 6/2013 | Jain ....................... H04W 4/02 709/219 |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0173796 A1* | 7/2013 | Grab .................. H04N 21/6582 709/225 |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089449 A1* | 3/2014 | Bhogal ................ H04L 67/1097 709/213 |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |

(56) References Cited

U.S. PATENT DOCUMENTS

| | | |
|---|---|---|
| 2014/0222953 A1 | 8/2014 | Karve et al. |
| 2014/0244851 A1 | 8/2014 | Lee |
| 2014/0245298 A1 | 8/2014 | Zhou et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0178133 A1 | 6/2015 | Phelan et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0062689 A1* | 3/2016 | Cherubini ............ G06F 3/0623 711/159 |
| 2016/0062786 A1 | 3/2016 | Meng et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0105393 A1 | 4/2016 | Thakkar et al. |
| 2016/0127184 A1 | 5/2016 | Bursell |
| 2016/0132784 A1* | 5/2016 | Bevan ..................... G06F 16/00 706/52 |
| 2016/0134557 A1 | 5/2016 | Steinder et al. |
| 2016/0164914 A1 | 6/2016 | Madhav et al. |
| 2016/0188527 A1 | 6/2016 | Cherian et al. |
| 2016/0226965 A1* | 8/2016 | Labranche ............ H04L 67/16 |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0041342 A1 | 2/2017 | Efremov et al. |
| 2017/0048308 A1* | 2/2017 | Qaisar .................... H04L 67/12 |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0171158 A1 | 6/2017 | Hoy et al. |
| 2017/0264663 A1 | 9/2017 | Bicket et al. |
| 2017/0295246 A1* | 10/2017 | Georgiou ............ H04L 43/0864 |
| 2017/0339070 A1 | 11/2017 | Chang et al. |
| 2018/0095696 A1* | 4/2018 | Resch .................... G06F 3/0619 |
| 2021/0203752 A1* | 7/2021 | Beattie, Jr. ............ H04L 47/781 |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "A Look at DeltaCloud: The Multi-Cloud API," Feb. 17, 2012, 4 pages.

Author Unknown, "About Deltacloud," Apache Software Foundation, Aug. 18, 2013, 1 page.

Author Unknown, "Architecture for Managing Clouds, A White Paper from the Open Cloud Standards Incubator," Version 1.0.0, Document No. DSP-IS0102, Jun. 18, 2010, 57 pages.

Author Unknown, "Cloud Infrastructure Management Interface—Common Information Model (CIMI-CIM)," Document No. DSP0264, Version 1.0.0, Dec. 14, 2012, 21 pages.

Author Unknown, "Cloud Infrastructure Management Interface (CIMI) Primer," Document No. DSP2027, Version 1.0.1, Sep. 12, 2012, 30 pages.

Author Unknown, "cloudControl Documentation," Aug. 25, 2013, 14 pages.

Author Unknown, "Interoperable Clouds, A White Paper from the Open Cloud Standards Incubator," Version 1.0.0, Document No. DSP-IS0101, Nov. 11, 2009, 21 pages.

Author Unknown, "Microsoft Cloud Edge Gateway (MCE) Series Appliance," Iron Networks, Inc., 2014, 4 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

Author Unknown, "Real-Time Performance Monitoring on Juniper Networks Devices, Tips and Tools for Assessing and Analyzing Network Efficiency," Juniper Networks, Inc., May 2010, 35 pages.

Author Unknown, "Use Cases and Interactions for Managing Clouds, A White Paper from the Open Cloud Standards Incubator," Version 1.0.0, Document No. DSP-IS00103, Jun. 16, 2010, 75 pages.

Author Unknown, "Apache Ambari Meetup What's New," Hortonworks Inc., Sep. 2013, 28 pages.

Author Unknown, "Introduction," Apache Ambari project, Apache Software Foundation, 2014, 1 page.

Beyer, Steffen, "Module "Data::Locations?!"," YAPC::Europe, London, UK,ICA, Sep. 22-24, 2000, XP002742700, 15 pages.

Borovick, Lucinda, et al., "Architecting the Network for the Cloud," IDC White Paper, Jan. 2011, 8 pages.

Bosch, Greg, "Virtualization," last modified Apr. 2012 by B. Davison, 33 pages.

Broadcasters Audience Research Board, "What's Next," http://lwww.barb.co.uk/whats-next, accessed Jul. 22, 2015, 2 pages.

Cisco Systems, Inc. "Best Practices in Deploying Cisco Nexus 1000V Series Switches on Cisco UCS B and C Series Cisco UCS

(56) References Cited

OTHER PUBLICATIONS

Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in JunoSphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Ye, Xianglong, et al., "A Novel Blocks Placement Strategy for Hadoop," 2012 IEEE/ACTS 11th International Conference on Computer and Information Science, 2012 IEEE, 5 pages.
International Search Report and Written Opinion for the corresponding International Application No. PCT/US2017/044437, from the International Searching Authority, dated Sep. 18, 2017, 13 pages.
Examination Report for EP application No. 17754529.0 dated May 24, 2022, 9 pages.

\* cited by examiner

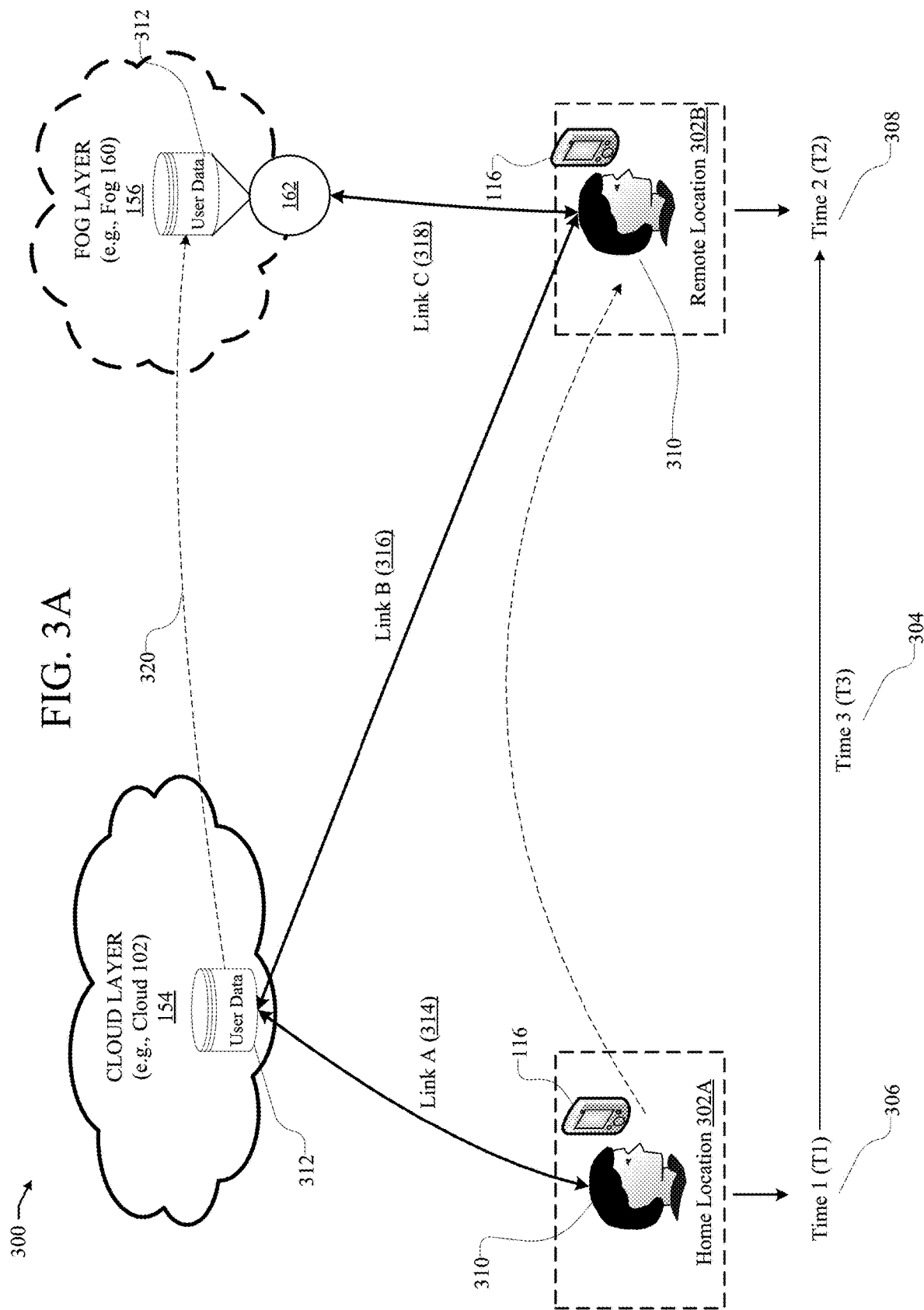

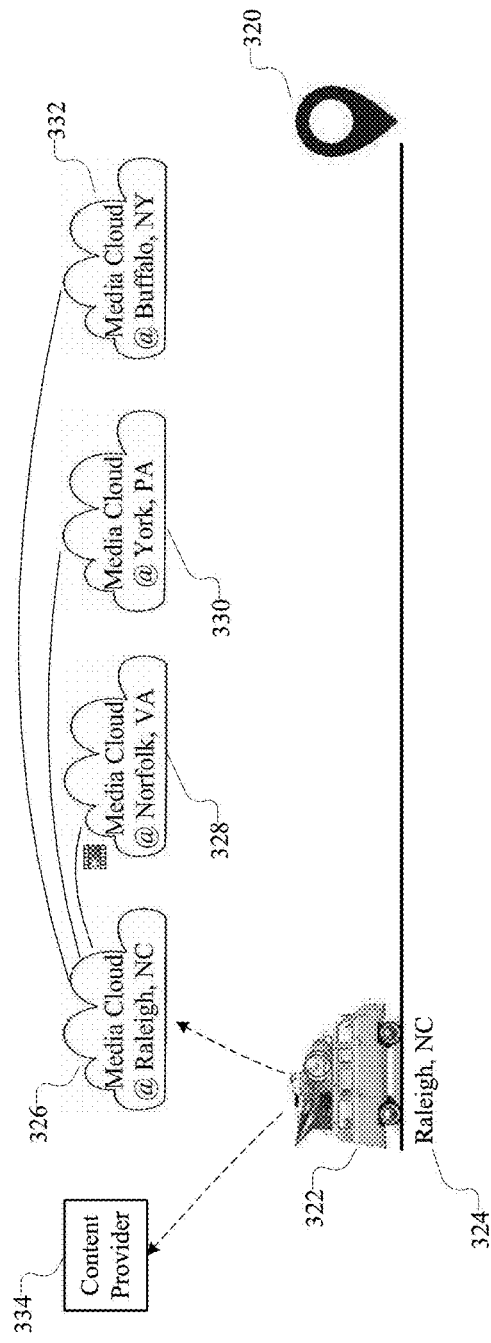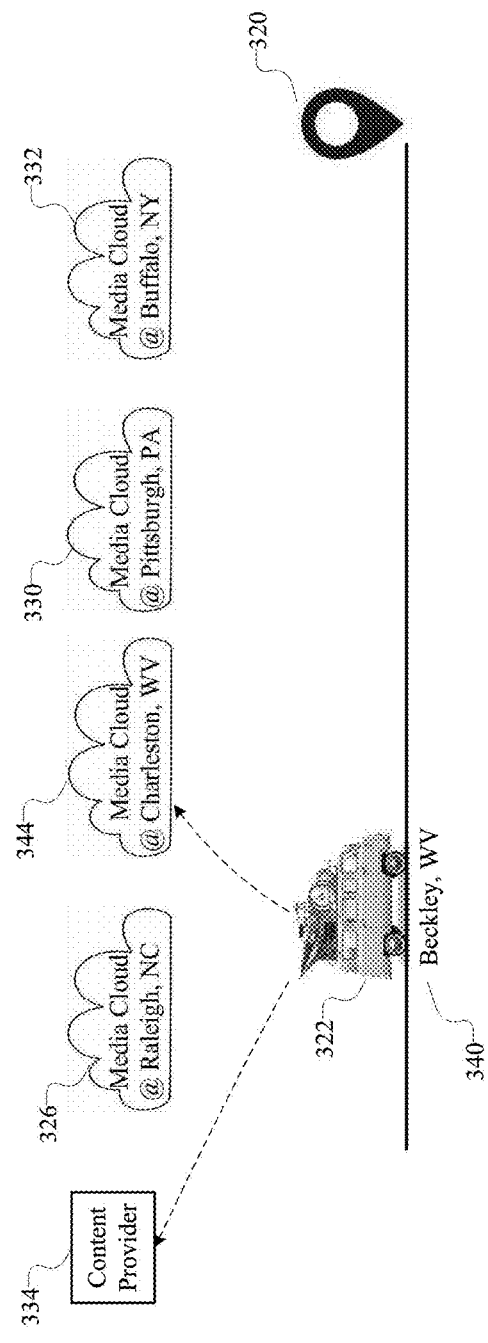

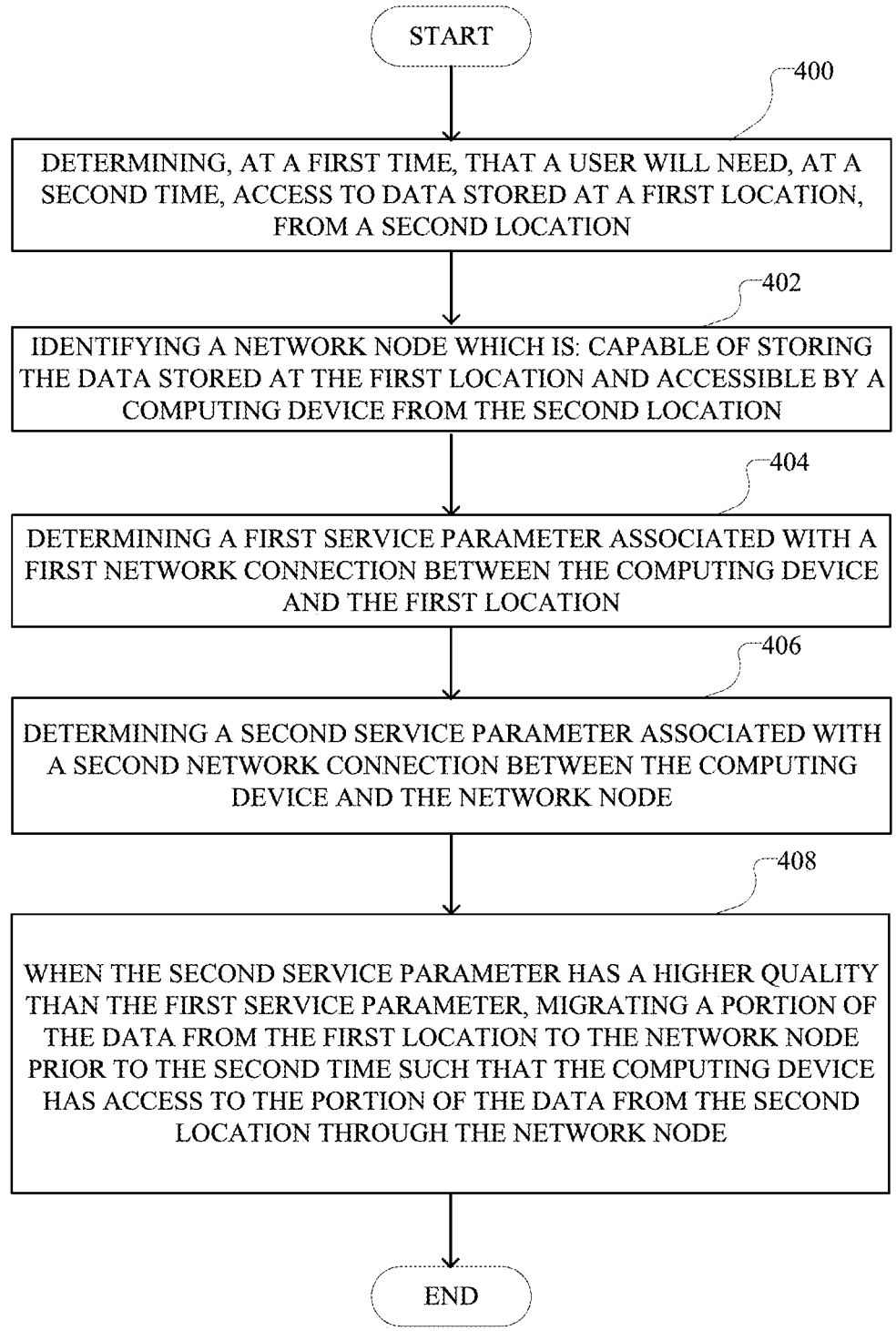

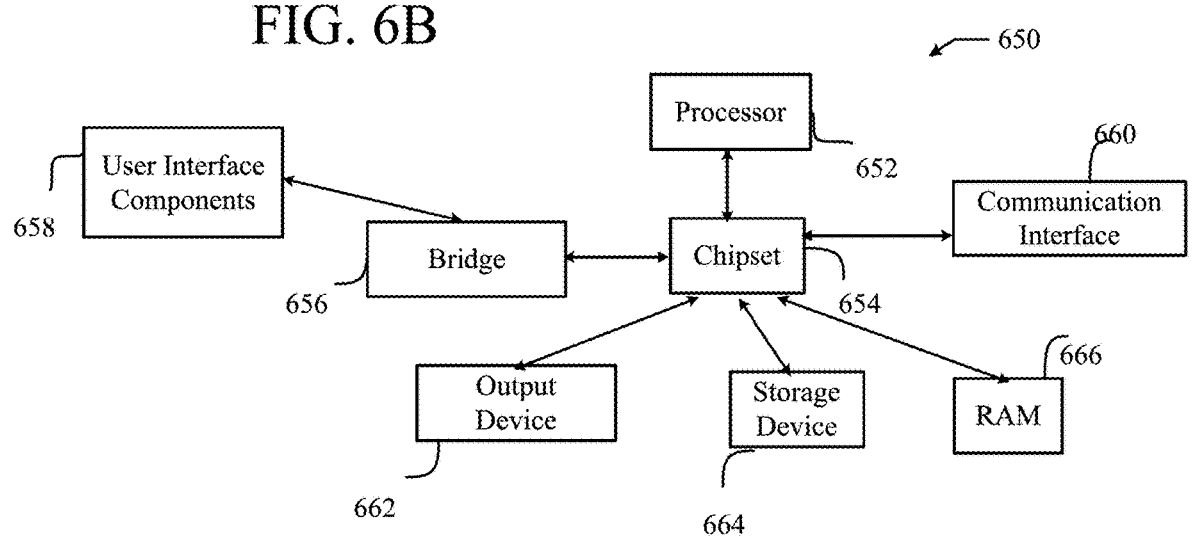
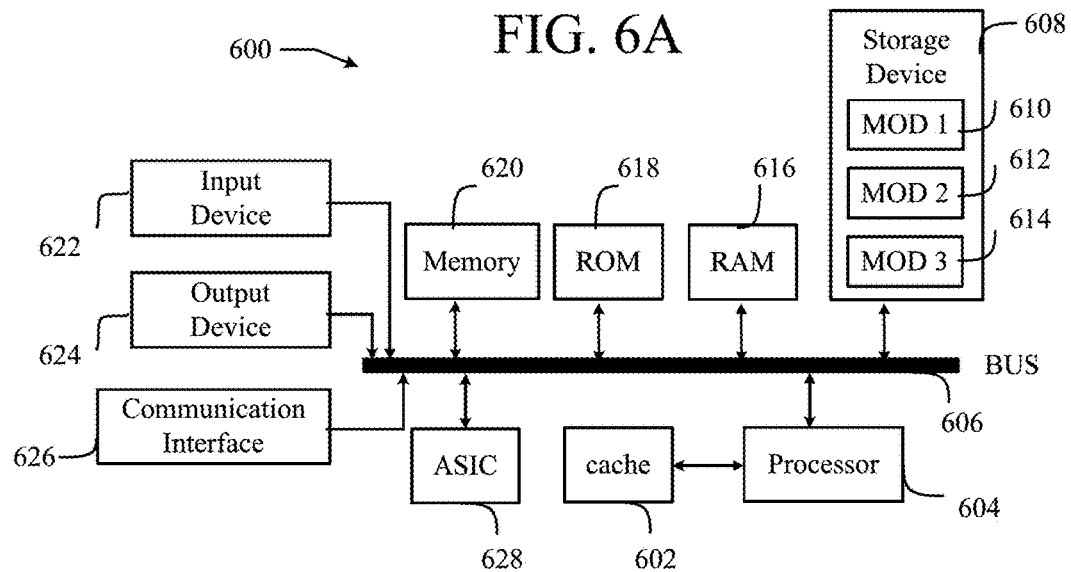

ORCHESTRATION SYSTEM FOR MIGRATING USER DATA AND SERVICES BASED ON USER INFORMATION

CROSS-REFERENCE TO RELATED APPLICATION

This application is a continuation of U.S. patent application Ser. No. 15/289,755 filed on Oct. 10, 2016, the contents of which is incorporated by reference in its entirety.

TECHNICAL FIELD

The present technology pertains to cloud and data center orchestration systems, and more specifically, integration of predictive scheduling and location systems with data center orchestration systems for intelligent migration of network data and network access points between geographic areas and network layers based on user information and context.

BACKGROUND

As a result of globalization, traveling and mobilization has become a very common part of business. Employees in a companies' workforce must frequently move from location to location for business. At the same time, employees typically require reliable and quick access to their network data to complete their tasks and business objectives. Large, global organizations typically have data centers and network access points at multiple locations around the globe. Users on the road can generally choose to connect to the organization's network through access points geographically close to them. However, the location of the user's data will not change: the user's data will still be hosted at the user's home site. Unfortunately, remote data access can add significant delay a latency, which can lead to lost productivity.

Sometimes, users may connect to remote compute resources that are close to the users' data (e.g., local UNIX hosts or Remote Desktop clients). However, this approach requires long round-trips, which will also result in significant delay. Further, accessing data on far remote servers also requires an extra share of network capacity, and may have additional security risks. Accordingly, current solutions for remote data access have significant performance, security, and cost limitations.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3A illustrates a schematic diagram of an example orchestration system for migrating data between systems or locations at different times based on user context and information;

FIGS. 3B through 3E illustrate an example geo-location aware mobile cloud system;

FIG. 4 illustrates an example method;

FIG. 6A and FIG. 6B illustrate example system embodiments.

DESCRIPTION OF EXAMPLE EMBODIMENTS

Figure 1A:
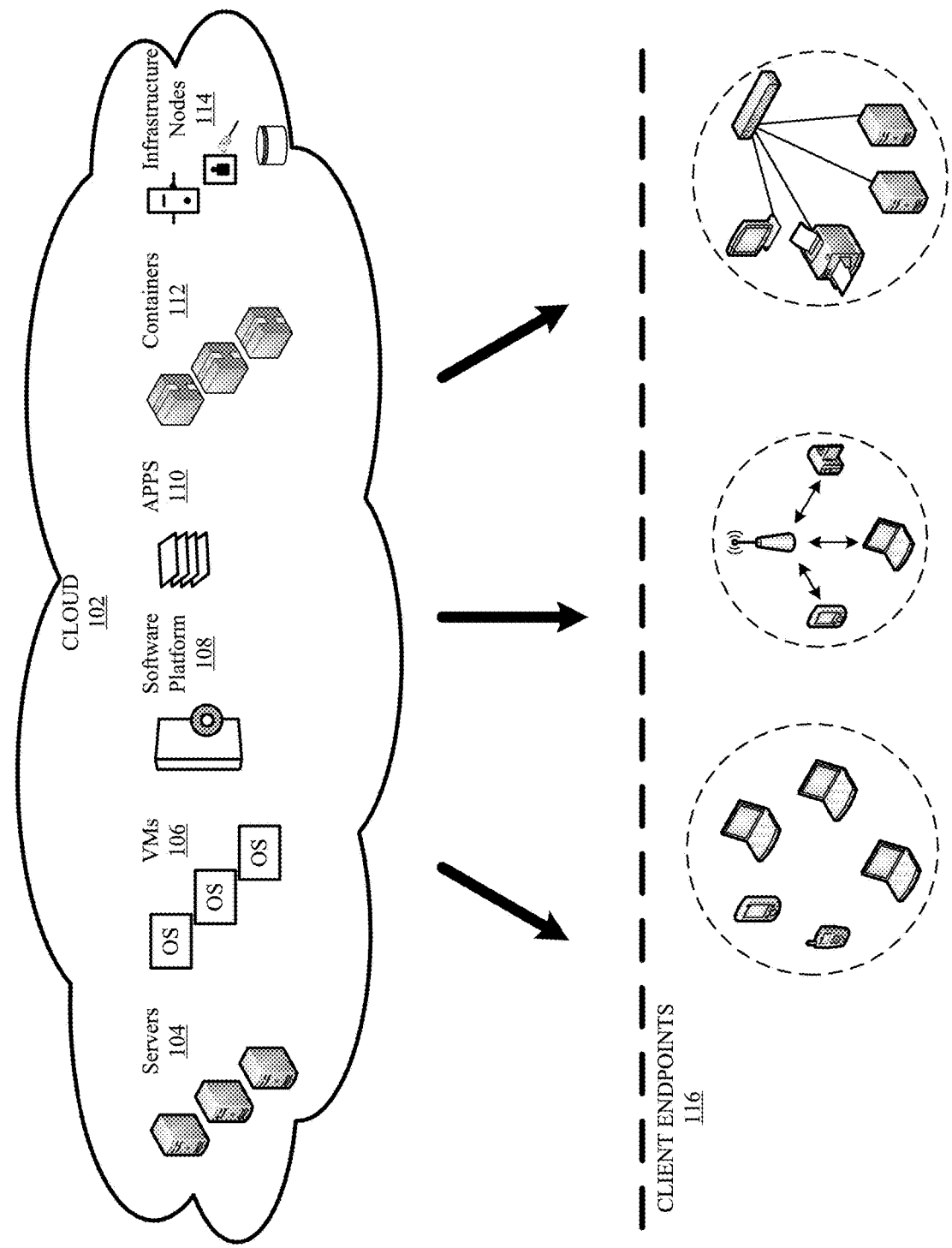
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As previously mentioned, remote data access can add significant delays and latencies, which can lead to higher costs and lost productivity. Moreover, remote data access can require additional network resources or capacity and may create additional security risks. The approaches set forth herein can eliminate or reduce these problems by integrating systems that schedule travel or anticipate movement of a cloud or network client into data center orchestration to provide always local access to data and other network resources to traveling users.

The approaches set forth herein can provide geographically optimized access to data center resources, such as applications, VMs, container data and services, and data itself. Various systems can be integrated so that resource movement is seamless and coincides with users' down times or network's lightly loaded times. For example, connected transportation and smart vehicle systems can be integrated with orchestration systems to provide localized access to data even while in transit. This can result in increased productivity by eliminating delay when accessing resource and services. The approaches herein can identify which fog node(s) are within service range of the expected user positions, and pre-load the context each user will likely need onto the identified fog node(s), before the user arrives. Various strategies herein can provide support for machine learning to optimize data replication. Moreover, the approaches herein can support high speed environments with frequent handoffs like high speed rail, Hyperloop, UAV networks, and LEO satellite constellations with large networks of ground stations. In IoT networks, some of this data may be used in real-time critical control systems, where local data access is essential to meet the system's latency targets.

Disclosed are systems, methods, and computer-readable storage media for orchestrating data center resources and managing user access to data based on a predicted context and geographic location of a user. In some examples, a system can determine that a user will need, at a future time, access from a remote location to data hosted at a home location on a network. The system can then identify one or more network nodes residing within a geographic area and/or a proximity to the remote location, and migrate at least a portion of the data hosted at the home location to the one or more network nodes. The system can also facilitate access by the user to the data from the remote location.

DESCRIPTION

The disclosed technology addresses the need in the art for mechanisms to decrease delays, latencies, and security risks associated with remote data access. The present technology involves system, methods, and computer-readable media for efficiently and effectively orchestrating network resources and data access in order to provide traveling users with always local access to data and network resources.

Figure 1B:
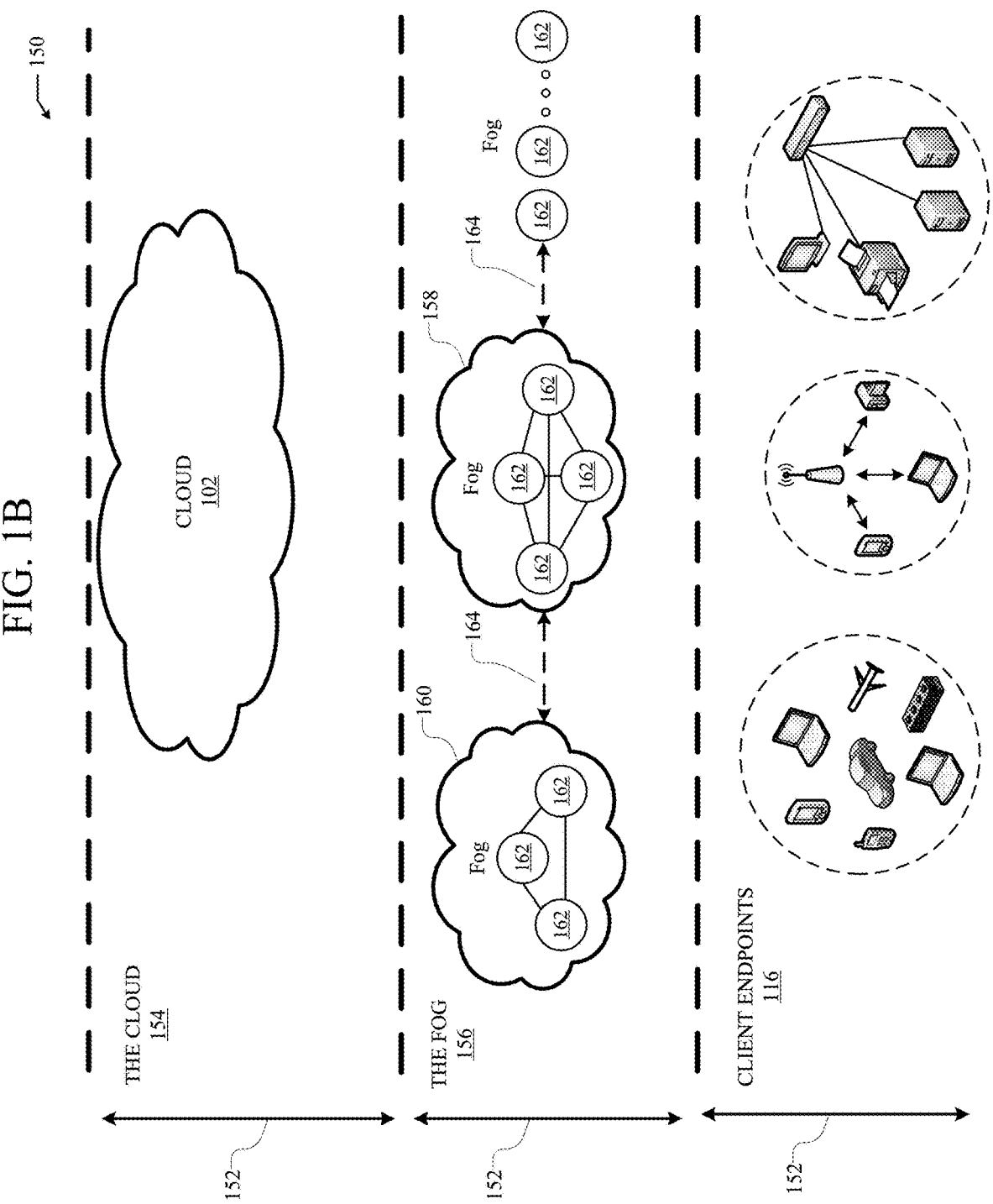
FIG. 1B illustrates an example fog computing architecture.
Figure 2:
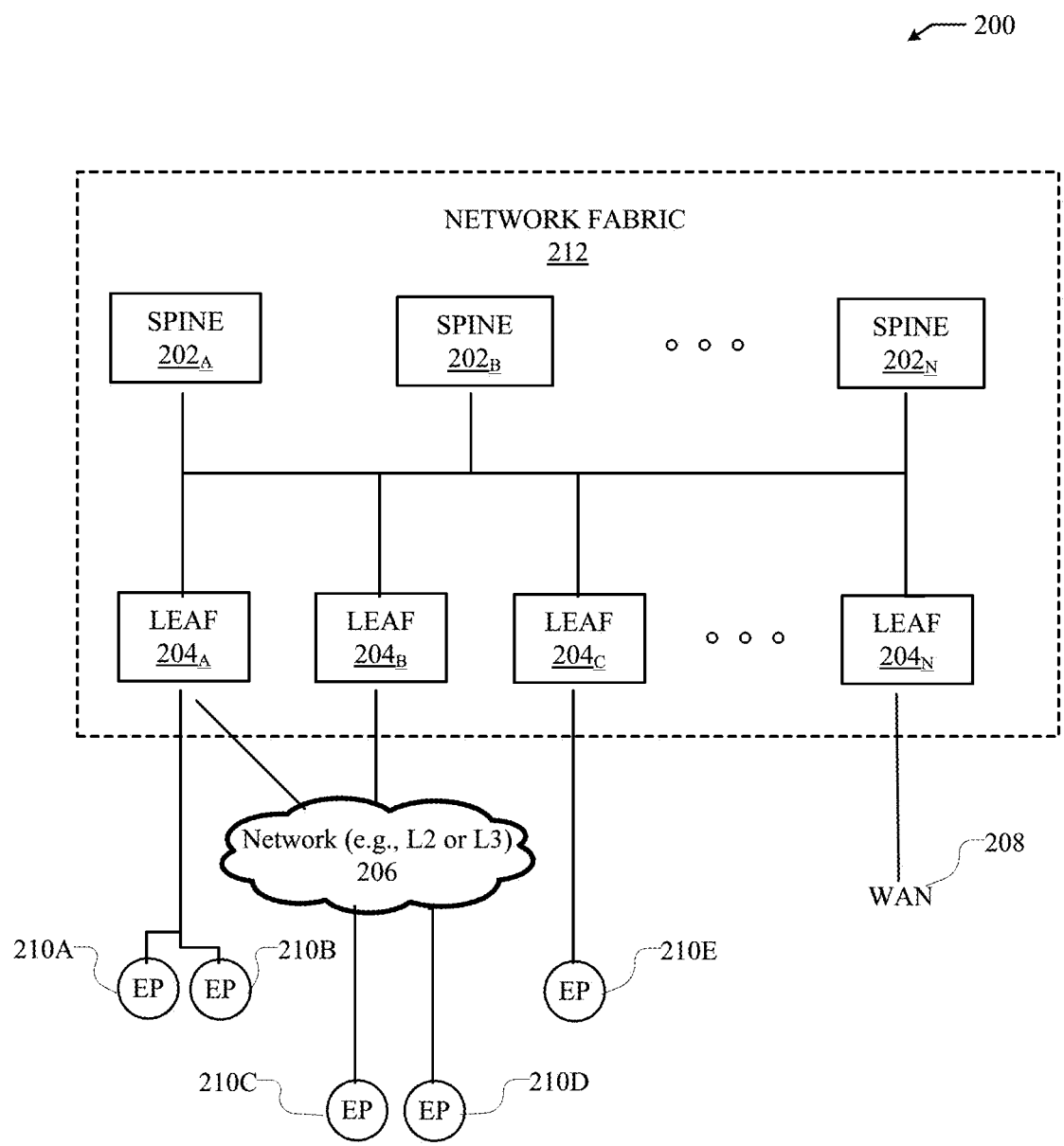
FIG. 2 illustrates a schematic diagram of an example network architecture.
Figure 5:
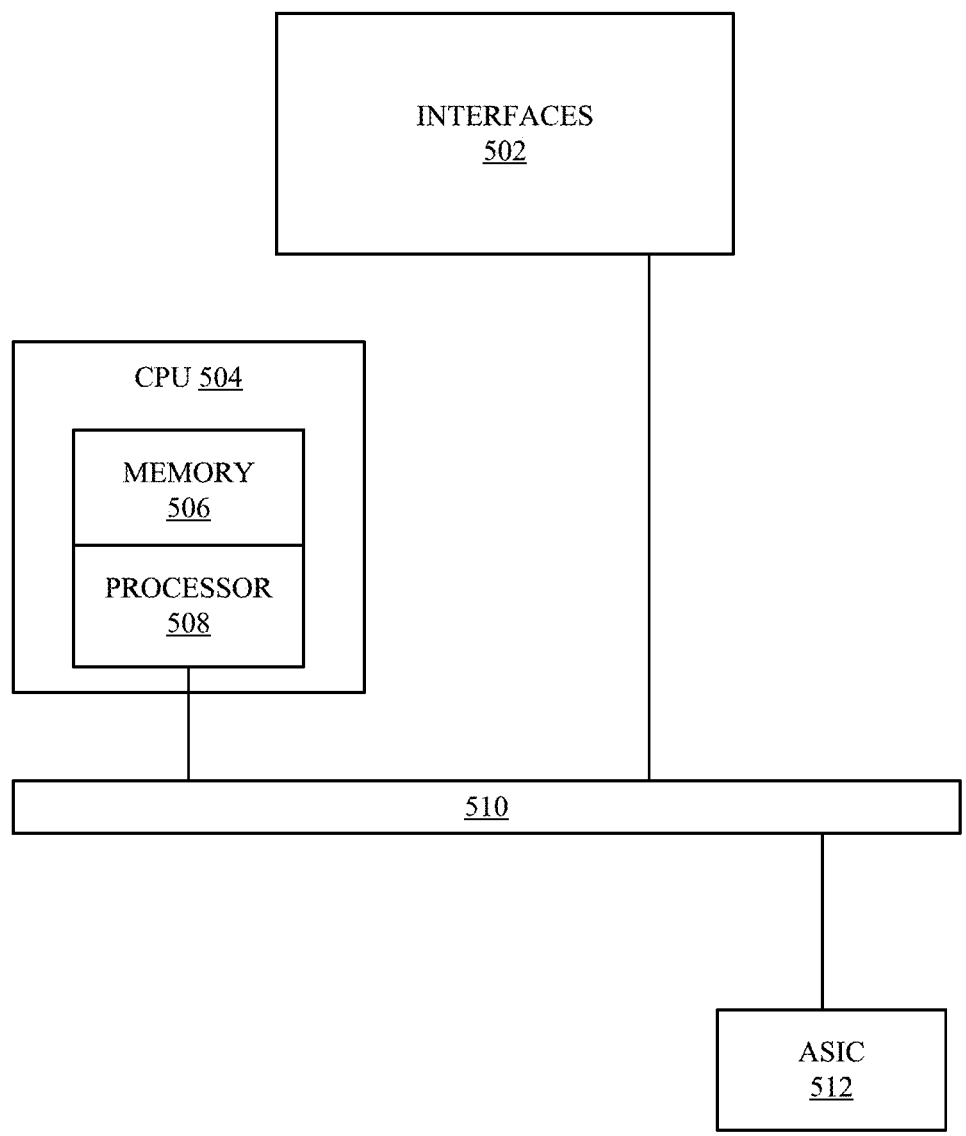
FIG. 5 illustrates an example network device in accordance with various embodiments.

A description of network environments and architectures for network data access and services, as illustrated in FIGS. 1A, 1B, and 2, is first disclosed herein. A discussion of mechanisms for orchestrating network data access, as illustrated in FIGS. 3-4, will then follow. The discussion then concludes with a brief description of example devices, as illustrated in FIGS. 5 and 6A-B. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 illustrates a schematic block diagram of an example network architecture 200. In some cases, the architecture 200 can include a data center, which can support and/or host the cloud 102. Moreover, the architecture 200 includes a network fabric 212 with spine switches 202A, 202B, . . . , 202N (collectively "202") connected to leaf switches 204A, 204B, 204C, . . . , 204N (collectively "204") in the network fabric 212.

Spine switches 202 can be Layer 3 ("L3") switches in the fabric 212. However, in some cases, the spine switches 202 can also, or otherwise, perform Layer 2 ("L2") functionalities. Spine switches 202 connect to leaf switches 204 in the fabric 212. Leaf switches 204 can include access ports (or non-fabric ports) and fabric ports. Fabric ports can provide uplinks to the spine switches 202, while access ports can provide connectivity for devices, hosts, endpoints, VMs, or external networks to the fabric 212.

Leaf switches 204 can reside at the boundary between the fabric 212 and the tenant or customer space. In some cases, the leaf switches 204 can be top-of-rack ("ToR") switches, aggregation switches, end-of-row (EoR), middle-of-row (MoR) switches, etc.

The leaf switches 204 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 204 can contain virtual switching and/or tunneling functionalities, such as a virtual tunnel endpoint (VTEP) function. Thus, leaf switches 204 can connect the fabric 212 to an overlay (e.g., VXLAN network).

Network connectivity in the fabric 212 can flow through the leaf switches 204. The leaf switches 204 can provide servers, resources, endpoints, external networks, or VMs access to the fabric 212, and can connect the leaf switches 204 to each other. In some cases, the leaf switches 204 can connect endpoint groups ("EPGs") to the fabric 212 and/or any external networks. Each EPG can connect to the fabric 212 via one or more of the leaf switches 204, for example.

Endpoints 210A-E (collectively "210") can connect to the fabric 212 via leaf switches 204. For example, endpoints 210A and 210B can connect directly to leaf switch 204A, which can connect endpoints 210A and 210B to the fabric 212 and/or any other of the leaf switches 204. Similarly, endpoint 210E can connect directly to leaf switch 204C, which can connect endpoint 210E to the fabric 212 and/or any other of the leaf switches 204. On the other hand, endpoints 210C and 210D can connect to leaf switch 204A and 204B via network 206. Moreover, the wide area network (WAN) 208 can connect to the leaf switches 204N.

Endpoints 210 can include any communication device, such as a computer, a server, a switch, etc. In some cases, the endpoints 210 can include a server or switch configured with a virtual tunnel endpoint functionality which connects an overlay network with the fabric 212. For example, in some cases, the endpoints 210 can represent hosts (e.g., servers) with virtual tunnel endpoint capabilities, and running virtual environments (e.g., hypervisor, virtual machine(s), containers, etc.). An overlay network associated with the endpoints 210 can host physical devices, such as servers; applications; EPGs; virtual segments; virtual workloads; etc. Likewise, endpoints 210 can also host virtual workloads and applications, which can connect with the fabric 212 or any other device or network, including an external network.

Having disclosed example network environments and architectures, the disclosure now turns to an overview of orchestration of network data access according to various approaches.

Typically, when a user travels from one site to another, some level of planning may be done (even if such planning is last minute). For example, some form of transportation may be booked, a hotel reservation may be made, dinner arrangements may be made, meetings may be scheduled, preparatory steps may be performed, destinations may be entered into navigation software applications, etc. If the system that is used to book the travel is integrated to data center orchestration systems, the data center can be made aware of when a specific user will be traveling and where the user will be going. The orchestration system can tie that user to data and other resources (e.g., applications) that the user typically uses. As the user travels (i.e., as the user physically moves from one location to another), the orchestration system can relocate the data from its current site, which may be a site that is, for example, geographically close to the user's "home base", to a remote site closest to the user's destination (e.g., a cloud server, a fog node, a local area network server, etc.). Thus, when the user arrives, the user is able to access the same data and resources from a data center more closely aligned to the user's current location. This can result in improved performance, efficiency, security, costs, etc.

The travel planning data can thus be used to anticipate the movements of the user, and help moderate the load on the networks, such as cloud-cloud networks. Presence systems can also be used to confirm the user's arrival at the destination, and signal the system to put the new location into effect. In some examples, the data can be organized in a container, which can be moved to the destination node and spun up just as the user arrives, for example.

In some cases, the data may not necessarily be moved. For example, the data can be copied, and change sets may then be replicated back to the "home base" location to update a master copy. In the case of applications or VMs (virtual machines), the resources can be serialized and moved to compute nodes closer to the user's new location. Depending on the data center architecture, VMs or applications can, in some configurations, be accessed using the same address, thus making the process transparent to the end user.

When the user is scheduled to travel back to the "home base" location, the orchestration system can relocate the data back, or simply destroy the temporary replicant or copy. As a user travels more and more over time, this system can learn from travel patterns and maintain remote data replicants in specific sites. For example, if a user regularly travels between New York and San Jose, copies of data and snapshots of VMs can be maintained in both sites with only change sets replicated back and forth. As the user moves between locations, the master data set can be changed to point to where the user currently is. Upon traveling back, the master pointer can be moved. The end result is optimized access to commonly-used resources.

As indicated above, presence systems and travel planning systems can be integrated with the data center orchestration systems that decide where the relevant data is hosted. Additionally, there need not be a focus simply on end-to-end locations. Depending on the size of the data set and the time a user spends in a specific location, data replication/movement can happen to intermediate locations. For example, if a user will travel between New York and Bangalore, that user may have an extended layover in London. During that time in London, the data could reside in a European data center for rapid, secure access from the airport. When the user continues the journey to Bangalore, the data may again be replicated or moved.

In addition to travel planning applications, many other mechanisms can be used to predict when a specific user will be within an operational range of a particular fog or cloud node. For example, the user's social media can be consulted to see if there is any mention of travel itinerary. The airline, rail, taxi, restaurant, hotel, etc., booking systems can generate pre-population requests, and even associate them with the specific addresses of mobile fog nodes on the vehicles the user will be riding or nearby enterprise fog nodes, for example. If the user is traveling on a linear course (e.g., on an interstate, rail line, river, etc.), the system can be made aware of the geography, topology, velocity, etc., and predict expected arrival times at fog nodes along the route. Navigation systems (e.g., in users' smartphones or vehicles they ride) can be integrated with the system as well to obtain navigation and location data, and any destinations the user enters.

Connected transportation systems and smart vehicles can also be implemented for obtaining traveling and scheduling data for the user. One such example involving the Hyperloop and extremely dynamic data moving is described below. Another example with more static data movement can be regarding air travel. As a passenger checks in, an application on the phone can detect check-in events, and data can be copied to internal storage facilities on the airport or plane on which the person will travel. The data can be transferred to the plane via high-speed connection as the plane waits at the gate (e.g., being fueled, loaded, etc.). This data can be stored in an encrypted manner and placed into a logical container accessible to that user. The plane then becomes a fog extension to the cloud (be it public or private). When the user boards the plane and scans in, the information can be sent to the plane and the cloud service so that the data pointer is solidified for the duration of the flight. If the user fails to board the plane, the plane can destroy the local copy of the data. When the user goes to access the data on the flight, the cloud service can redirect the user transparently to the local data. This can provide significant impacts on productivity.

Even finer granularity can also be used in very high performance systems with large data sets. Consider a user taking a cross-country journey riding on a high speed train or Hyperloop vehicle with ~24 passengers traveling in a pipe at ~1000 Kph. Wi-Fi or optical transceivers in the tube keep the vehicle in constant contact with the ground support network. Each ~2 km of the tube has a fog node to manage that segment of the tube, and drive the access point serving 1 Km of track in each direction. Handoffs between APs (access points) and fog nodes can occur every 7 seconds at these speeds. In order to maintain continuous connectivity and provide continuous service for all the vehicle functions, as well as streaming UHD entertainment from the cloud to each passenger, it may pre-populate all the fog nodes along the travel route with data the vehicle may anticipate needing for itself and passengers once it arrives at the node. If a Hyperloop vehicle is only in range of a given fog node for, e.g., ~7 seconds, over half the user-cloud data transport window may be wasted due to the combined delays.

Conversely, if we know when the user will be in range of a given fog node (even if the advance notice is only 10 seconds), we can pre-configure everything the user may need, and the entire ~7 second window of when the user is in range is available for internet communications.

Similar concepts can apply to Low Earth Orbit constellations of satellites designed for low transport latency operations. Depending upon the specific design and number of Earth stations, each satellite may experience a handoff every minute or so, and pre-population of data sources at the next anticipated Earth station may improve network throughput.

Pre-population of data in local fog nodes can significantly reduce latency to the cloud. Certain applications may be latency critical. For example, networked haptics, where a user has tactile feedback from a network-based application, can have stringent latency requirements. If such application is in the cloud, round trip latency can be several hundred milliseconds in some cases, yet the illusion of touch is often broken with latency much over 1 millisecond. Fog techniques can greatly help in this scenario. Similarly, in a telemedicine or remote surgery application, the anatomical data sets that drive the haptic interface could be terabytes in size, and prepopulating them on fog nodes where the patient and doctor are will save valuable time.

Additionally, future user location based on a myriad of data sources, as described herein, can be 'learned' over time by cognitive systems such that intelligent and proactive correlation, prediction, etc., can be performed to improve accuracy and automate pre-population of data sources. For example, if a traveling user is streaming video along their journey then a corpus of a variety of data sources (e.g., air, train, car, mapping info, GPS/geo-location, NETFLIX user programming preferences, etc.) can be processed by cognitive systems to learn user travel habits and viewing preferences to provide an optimal user experience during their journey (i.e., selection of closest streaming PoP (point-of-presence), optimal handoff between streaming PoPs, etc.).

Geolocation information can be used in some examples for geolocation-aware mobile cloud and event triggered content caching in ICN (information-centric networking) and CNN (content-centric networking) environments. In some examples, geolocation-aware mobile cloud and event triggered content caching can include various components, including data mobility based on smart user location-based triggers, intelligent prioritization for data mobility, contextually relevant smart tagging for data mobility, etc.

Each of these components can be implemented to intelligently obtain user location information and leverage location-awareness to strategically move a user's data in a manner that provides a seamless end-user experience, especially for low-latency and real-time applications. Below is a general description of each of the various components.

Data Mobility Based on Smart User Location-Based Triggers

A centralized intelligent system can monitor the geolocation of the user (e.g., GPS position of the car, location of the user's mobile phone, etc.) and instruct the cloud to move/replicate data to the nearest content provider or cache storage. The intelligent system can use the user's location to decide where to move the upload data (to the most appropriate server), typically the one closest to the user.

A variety of optimizations can be implemented for user data prioritization, automated location passing, future location prediction, etc.). Moreover, by leveraging the user-location (present and/or future), the system can significantly improve the user experience when accessing media content by reducing delay and improving overall user experience. Users can access the data faster in both directions—download and upload.

The system can use predictive analytics in order to determine where a user is about to be, and what data is likely to be needed. For example, if the user is a frequent traveler, and recently acquired new content, the system can proactively move the new content to the expected location. If a user has been working exclusively on a certain urgent project, the system can preferentially select data associated with that project for pre-population, while old archived projects may not be sent. Since this is being done before the data is actually needed, it can be done at a lower bandwidth and/or cost.

If there is content that the user frequently accesses (or frequently accesses while traveling), that content can be proactively moved whenever the user arrives at a new location.

These concepts can be implemented in a variety of contexts. For example, a typical brainscan might include thousands of files, and can be several gigabytes in size. Accordingly, a brainscan can take a long time to obtain or download. Imagine a surgeon that stores high quality CAT scans in the cloud and downloads them for viewing as needed. When the doctor goes to locations that do not have good cloud coverage, getting the images can be very time consuming. However, the system here can recognize that the doctor is traveling, and might proactively move pertinent scans to a more suitable location vis-à-vis the doctor's location. The doctor can then access the scans with reduced latency.

As another example, imagine a traveling journalist or film maker that stores media assets in the cloud, and needs easy reach to them from any current location. The system here can greatly reduce the latency experienced by the journalist or film maker from different locations. By anticipating the location of the journalist or film maker, the system can pre-populate the potentially large media files on servers that can access them very quickly, even though the network bandwidth at the remote location may be very slow.

The system can cache data when the data flow is received and forwarded by the node. In addition, the system can perform location-based data caching using a variety of triggers. Triggers can be manual and/or automated. Non-limiting examples of location-based data caching and triggers include:

A user manually specifies location details to the cloud system (e.g., via a button in Maps application for a trip upload, etc.).

Policy-driven travel plan updates, such as a user configured policy to trigger data to move only when travel exceeds 100 miles from original location, for example.

Location data dynamically obtained based on a user's travel schedules, travel booking systems, user's calendar, user's personal scheduler, etc.

Geo-location triggers, such as GPS, 3G/4G/5G/LTE, user roaming to another carrier network, etc.

Cognitive Systems (e.g., learned travel patterns).

A user can also flag content as "mobile" content, which can trigger location-based caching of that content. For example, the system can track the user, and try to have the content follow the user as the user moves around.

Based on the above examples, the user's data can be cached in one or more content forwarders, which can improve and facilitate the user's access to the data.

Intelligent Prioritization for Data Mobility

Another component can include intelligent prioritization for data mobility. This component provides the ability to prioritize user data that is determined (or predicted) to be moved (e.g., as described in the data mobility component above) for a particular user or group/class of user. Non-limiting examples for intelligent prioritization of user data include:

User manually configures (e.g., in profile, application, etc.) an assigned priority to specific data or types of data/applications.

Policy driven auto-prioritization of user data based on a variety of algorithms, including frequency of usage, most recently used, etc.

Priority marking of data based on smart-tagging of data that is marked to be moved.

Priority marking of user data based on usage analytics.

Priority marking of user data based on cloud provider subscription levels (e.g., platinum, gold, etc.).

Data priority based on analysis by learning/cognitive systems. This includes analyzing the data access history from previous similar trips.

To illustrate, in one example, the system can determine for a particular user what kind of data the user is most likely to need when on the go (e.g., new data, big data, frequently accessed data, etc.). The system can learn or discover (e.g., using cognitive systems) data usage patterns based on a variety of factors, such as geography of origin/destination, type of trip (e.g., work or leisure), history of similar trips, etc.

Patterns can be ascertained from a single user and/or a multiple users. For example, the system may learn that as people travel around the world, there are types of data they need in high access depending on their destination: users that travel to Antarctica tend to take family photos with them, whereas users that travel to Europe tend to take engineering CAD files with them.

Contextually Relevant Smart Tagging for Data Mobility

Another component can include contextually relevant smart tagging for data mobility. Data can be tagged in a manner that is related to, or impacts, user data mobility. For example, a user can manually tag the user's data with an explicit tag that indicates whether something should be moved or not. Furthermore, the user can use more sophisticated manual tagging of data based on a variety of mobility-impacting criteria, such as marking content as work-related or personal (e.g., leisure/hobby/vacation). The granularity of the tagging can be flexible and implementation-specific based on need.

The tagging can be manual, automated, and/or even predicted. A few non-limiting examples can include:

Manual tagging by user.

Auto-tagging of user data based on function (e.g., work, personal, etc.).

Auto-tagging of user data based on usage profile or analytics.

Application-specific tagging for data mobility.

Auto-tagging based on cognitive/learning system analysis of past tagging.

To illustrate, a user may use a particular vendor for audiobooks and have a variety of reading lists that range from technical books to a fun summer reading list. The ability to contextually tag each of those audiobooks differently (e.g., one perhaps with a 'mobile-work' tag and the other a 'mobile-vacation' tag) in a manner can allow the system to, based as well on the components discussed above, intelligently determine that the user will be in Hawaii for vacation in 22 days and that the movement of data to the nearest storage/cache point should prioritize data marked with the relevant 'mobile-vacation' tag.

The disclosure now turns to FIG. 3A, which illustrates a schematic diagram of an example orchestration system 300 for migrating data between systems or locations at different times based on user context and information. User 310 can access the user's data 312 from home location 302A. Home location 302A can be a location (e.g., geographic location or region, such as a country, city, state, or continent; a building such as an office building; an access point, such as a fog node, network or gateway; an address; a vehicle; etc.) where the user 310 typically accesses the data 312, is designated to work from, the user 310 resides, etc. These are non-limiting examples provided for the sake of clarity and explanation. Indeed, the location 304 can be any other location where the user 310 has accessed, is accessing, and/or is expected to uses the data 312 from.

The data 312 can be hosted in the cloud layer 154. Thus, the user 310 can access the data 312 on the cloud layer 154 from the home location 302A, through link A (314) between the cloud layer 154 and the user's computing device at the home location 302A. The computing device can be any computing and/or or connected device with network capabilities (e.g., client endpoints 116).

The user 310 may access the data 312 from the home location 302A at time 1 (306). However, a determination may be made that the user 310 will be traveling to remote location 302B at time 2 (308), and may need or try to access the data 312 at time 2 (308) from the remote location 302B. In response, a determination can be made that user access to data 312 from the remote location 302B may be improved if the data 312 (or at least a portion of the data 312) is migrated to remote node 162, in order to allow the user 310 to access the data 312 through remote node 162 from the remote location 302B.

For example, a determination can be made as to whether the quality and/or characteristics of user access (e.g., performance, security, costs, bandwidth, latency, burden, resource requirements, stability or reliability, etc.) to the data 312 from the remote location 302B is/are better if the user 310 accesses the data 312 from the remote location 302B through the cloud layer 154 or through a different node(s), network(s), cloud(s), fog(s), location, etc. If a determination is made that the quality and/or characteristics of user access to the data 312 from the remote location 302B can be improved by allowing the user 310 to access the data 312 through a remote node 162 instead of the cloud layer 154, then the data 312, and/or a portion thereof, can be migrated to the remote node 162.

The remote node 162 can be selected from among one or more remote nodes, networks, locations, etc. For example, the remote node 162 can be selected based on any other nodes or networks within a proximity or geographic area of the remote location 302B. It could also be selected based upon logical proximity, that is the most efficient or highest performing network location regardless of physical geography. Moreover, the remote node 162 can, in some cases, include multiple nodes either from the same network or layer (e.g., cloud layer 154, fog layer 156, same network, etc.), or from different networks or layers. For example, in some cases the remote node 162 can include multiple nodes distributed across different networks or layers, or the same network or layer. The remote node 162 is referenced herein as a single node as a non-limiting example provided for the sake of clarity and simplicity.

To determine whether the quality and/or characteristic(s) of user access to the data 312 from the remote location 302B is/are if the data 312 is stored and accessed via the cloud or the remote node 162, the quality and/or characteristic(s) of links A and B (316, 318) can be compared. Link A (316) can be the connection or link to the cloud layer 154 from the remote location 302B, and link B (318) can be the connection or link from the remote location 302B to the remote node 162, where the user could alternatively access the data 312 from remote location 302B.

To this end, respective user access parameters for links B and C (316, 318) can be ascertained and compared or analyzed to determine whether the user 310 should access the data 312 through the cloud layer 154 or the remote node 162. The user access parameters can include parameters for performance quality (e.g., latency, throughput or bandwidth, availability, uptime, etc.), security quality (e.g., encryption, security risks or potential vulnerability, accessibility by the public, etc.), a cost (e.g., routing or switching costs, service costs, etc.), geographic location (e.g., distance to the remote location 302B, the home location 302A, and/or the cloud layer 154; geographic location such as country, continent, city, town, etc.; reachability; etc.), and so forth.

The remote node 162 can be selected over the cloud layer 154 as the access point and/or storage point for data 312 while the user 310 is at the remote location 302B, when the user parameters indicate that the remote node 162 would result in increased performance quality (e.g., lower latency, higher throughput or bandwidth, more availability or uptime, etc.), increased security quality (e.g., better encryption, lower security risks or vulnerabilities, less access to the public or unauthorized users, greater security controls or measures, greater protections, etc.), lower cost (e.g., lower routing or switching costs, lower service charges or costs, lower costs from resources or resource usage, etc.), better geographic location (e.g., closer in distance or proximity, better or greater number of resources, etc.), lower resource requirements or consumption, etc.

Once the remote node 162 has been selected and/or identified, the data 312 or a portion of the data 312 can be migrated to the remote node 162 or a network associated with the remote node 162 (e.g., fog 158, fog 160, the fog layer 156, a regional cloud, etc.). In some configurations, the data 312 can be scheduled for migration to the remote node 162 prior to time 2 (308). However, in some cases, the data 312 can be migrated to the remote node 162 as the user 310 travels from the home location 302A to the remote location 302B, so the data starts at the home location 302A in time 1 (306) and ends at the remote node 162 at time 2 (308). The amount of time in advance of T2 308 that the migration of selected data from cloud layer 154 to fog layer 156 will be selected to accommodate the expected transfer rate on the cloud to fog link 320. Therefore at time T3 304, user data 312 transmission from cloud layer 154 to fog layer 156 will commence.

In some cases, the data 312 can be migrated to other nodes or access points (e.g., networks, gateways, servers, etc.) along the path from the home location 302A to the remote location 302B. For example, if the user is traveling from New York to Turkey and has a layover in London, the data 312 can be migrated to a node that is selected to host the data 312 during the user's stay in London, before the data 312 is migrated to Turkey. The node can be selected based on data access parameters associated with a link or connection to the node from London. For example, the node can be selected because the node is local to London or the node can provide less latency to the data 312 when accessed from London. The data 312 can then be migrated to the remote node in Turkey before the user 310 arrives at Turkey from London.

Figure 3D:
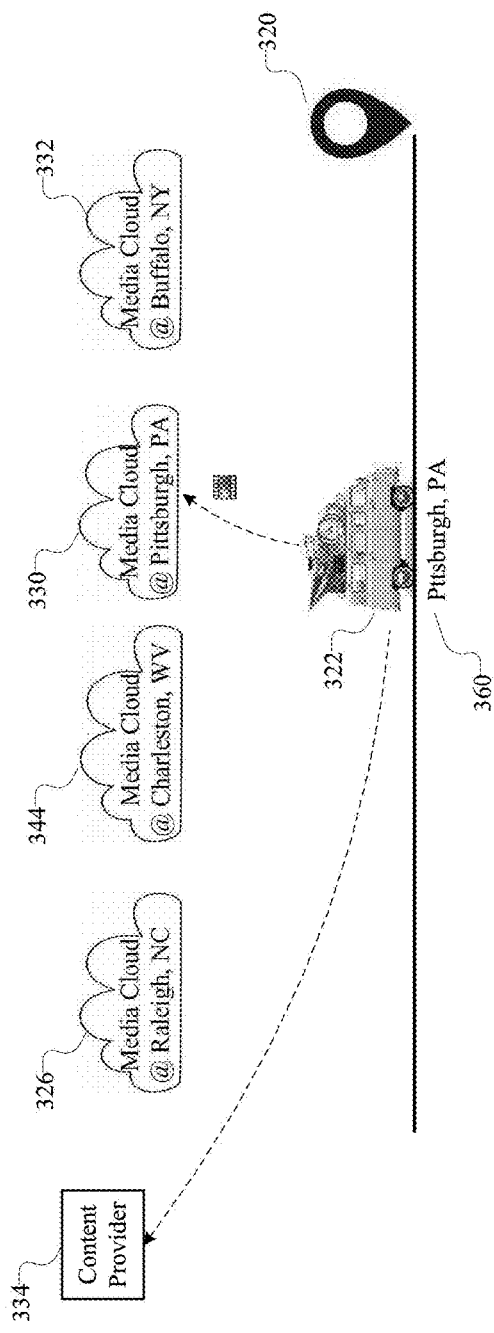

FIGS. 3B through 3E illustrate examples of a geo-location aware mobile cloud. Turning first to FIG. 3B, user 322 starts a summer road trip from their home location 324 at Raleigh, N.C. to a selected destination 320 at Niagara Falls.

At the start of the trip, the user 322 can look up directions to the travel destination and may share the journey map to the content provider 334 (e.g., provider of the cloud 102). The content provider 334 can determine content points 326-332 along the travel path, which can be cache points and/or data centers, such as clouds or fogs, for example. The content provider 334 can also determine the mode of travel of the user 322, and estimate approximate arrival times at intermediate geographic locations.

If this subscriber has taken personal trips in the past at around the same time in the last few years, the content provider 334 can intelligently and automatically determine that this trip a leisure or vacation trip. The content provider 334 can prioritize the data sets that are of interest to the user 322, such as new episodes of the user's favorite video shows, most frequently heard audio songs, eBooks that are currently being read, top new unread books in the user's reading list, etc. Depending on the estimated arrival times at each intermediate geographic locations (e.g., points 328-332), the user's data set of interest can be scheduled to be hosted or cached at points 326-332 along the travel path.

While the user 322 is at the home location 324 in Raleigh, the user 322 can access content from content point 326 at Raleigh. Content point 326 may provide the greatest benefits in terms of cost and performance to the user 322 while the user is at the home location 324. As the user 322 travels, the user 322 can access the content at the various content points 328-332 along the path.

With reference to FIG. 3C, as the user 322 travels, the media client used by the user 322, such as a web browser or media player, can update the user's current geographic location to the content provider 334. Content provider 334 can use the current location to decide when to redirect the media client from content point 326 to content point 344. This same concept can be extended to media uploads as well, such as uploading real-time video from the vehicle's external cameras to the closest video cloud. This facilitates faster uploads and quicker availability of data for analysis, such as forensic analysis of road accidents for insurance, legal, police purposes.

The current location information also enables the content provider 334 to determine changes in travel path and identify new intermediate content points where data can be hosted for faster access. For example, referring to FIG. 3B, the content provider 334 previously identified content point 328 at Norfolk, Va., as one of the potential hosts of the content data along the path. However, the content provider 334 can select a different content point based on changing conditions or circumstances. For example, referring back to FIG. 3C, content provider 334 can select content point 344 at Charleston W. Va., based on the user's current location 340, as well as any changing conditions.

The current location information also helps in deciding when to clear the content cache after the user 322 has passed across an intermediate location in the travel path.

The content provider 334 can determine the user's current location 340 is Beckley, W. Va. When the user 322 is at Beckley, W. Va., the content provider 334 can identify the next content point 344 as the content point 344 in Charleston, W. Va., instead of content point 328 in Norfolk, Va. The content point 344 can be selected based on, without limitation, the current location 340 of the user 322 as previously explained. Thus, the content point 344 can be the nearest data center for the user 322 while the user 322 is at Beckley, W. Va. This system adapts in the face of changing routes or schedules, anticipating the pre-caching of selected data.

The content provider 334 can redirect the client to access (i.e., download/upload) further data from content point 344 at Charleston, W. Va. If the user 322 chooses to see this week's episodes of show X, the user 322 can stream the content from content point 344. The content provider 344 would have already made this content available at the content point 344 in Charleston. The content can then be streamed to the client from content point 344 at faster speeds. User 322 can enjoy the show without any network interruptions such as download delays, intermediate pauses, buffering, etc.

Referring to FIG. 3D, the user 322 can continue traveling along the path. The content provider 334 can determine that the current location 360 of the user 322 is Pittsburgh, Pa. When the user 322 enters Pennsylvania, the content provider 334 can identify the next nearest content point 330, which is located in Pittsburgh, Pa., based on, without limitation, the user's current location 360. The content provider 334 can then redirect the client to access (i.e., download/upload) further content from the content point 330 in Pittsburgh, Pa.

For example, assume the user 322 accesses one of the recently purchased an eBook "Tourist Points in Buffalo" to start scheduling activities during the stay at the travel destination. The content provider 334 would have already had contextually tagged this eBook as a "mobile-vacation" data set and moved an electronic copy of this eBook to the content point 330 in Pittsburgh. This enables the user 322 to download the eBook quickly while still traveling on the road.

Figure 3E:
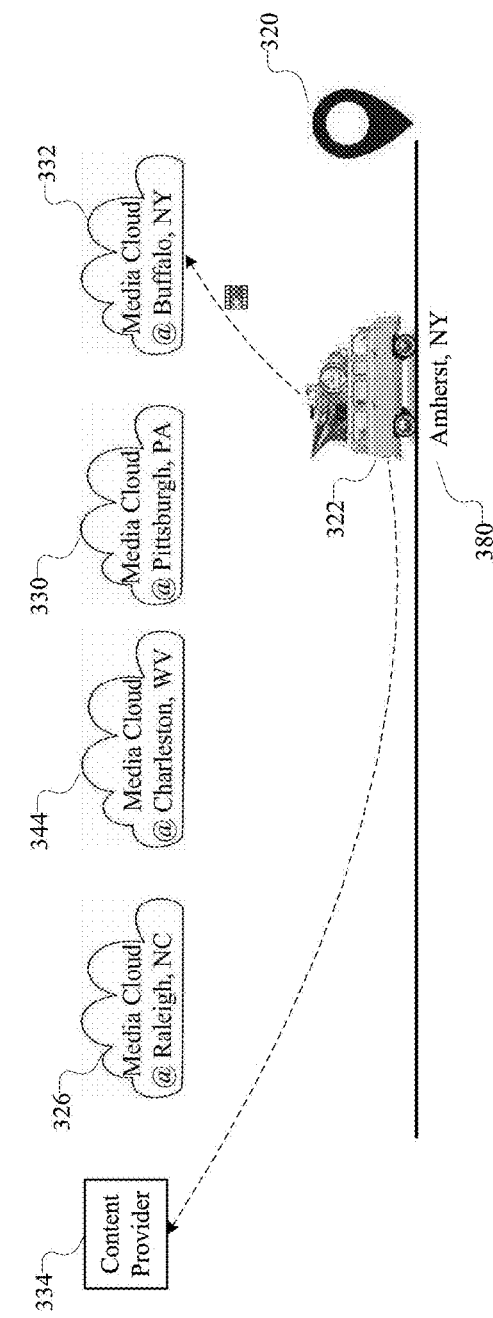

Referring to FIG. 3E, when the content provider 334 determines that the current location 380 of the user 322 is Amherst, N.Y., the content provider 334 can identify the next content point 332, which is located in Buffalo, N.Y., based on, without limitation, the users current location 380. The content provider 334 can redirect the client to access further data from the content point 322 in Pittsburgh. When the user reaches the travel destination 320, Niagara Falls, the content downloads and uploads are can be from/to the content point 332 in Buffalo since it is the nearest data cloud with best performance to offer the best user experience while the user 322 is at Niagara Falls. Also, at the phase of the journey depicted in FIG. 3E, content provider 334 may copy user data written to previous nodes, for example 330 back to home cloud 326, and then delete all used data associated with this trip from intermediate nodes 330.

The user 322 can access his/her favorite audio albums during the trail walks in Niagara Falls. The content provider 334 would have already classified the user's favorite audio songs as "mobile-personal" and moved the data set to the content point 332 in Buffalo. Hence, the user's client is able to download the streaming audio from the cloud and play the song instantly without any download delays. Similarly, user 322 can access other data of interest, such as favorite video shows, eBooks, family photos instantly during their stay at Niagara Falls, right from content point 332.

In forecasting or predicting the content points along the travel path, the content provider 334 can use the current location of the user 322 at different periods of time. The content provider 334 can also calculate or predict where the user 322 will be at different times as the user travels. As previously explained, the content provider 334 can also use other information to ascertain location data, make content point predictions, and/or cache data.

For example, user 322 can share the user's travel itinerary from travel web sites or airlines website to the content provider 334. To illustrate, the user 334 is traveling from USA to Africa at zip code 12345 using airline B on the 4th July. Based on the travel schedule, few hours before the 4th July, the personal or work related data of the user 322 is be cached in one more content forwarders around location 12345 in Africa. If Airline B has the provision of temporarily hosting the data, the user's data can be cached in the plane during the flight duration. When the user 322 reaches Africa, the data will be already available in a nearby cache for quick access.

In addition, the content provider 334 can use past travel events to deterministically predict upcoming travel plans. For example, user 322 typically travels to Europe during the December holiday time frame.

Cognitive system can learn based on a corpus of travel data (e.g., schedules, travel itineraries, social media systems, etc.) that a user attends Cisco Live or IETF conferences every year, and can determine those upcoming locations and move the user's data to that location.

The content provider 334 can also determine based on the individual use of data or based on the group use of data what data needs to be moved. For example, for the next Cisco Live conference that will take place in New Zealand, the content provider 334 could proactively or manually move the presentation data and the necessary data for the conference to a closer proximity.

Having disclosed some basic system components and concepts, the disclosure now turns to the example method embodiment shown in FIG. 4. For the sake of clarity, the method is described in terms of the architectures 100 and 150 shown in FIGS. 1A and 1B, and the orchestration system 300 shown in FIG. 3. The steps outlined herein are exemplary and can be implemented in any combination thereof, including combinations that exclude, add, or modify certain steps.

At step 400, the method can include determining, at a first time (306), that a user (310) will need, at a second time (308), access to data (312) stored at a first location (102), from a second location (302). The data (312) can include any type of data and/or service(s), such as streaming media, files, application content, database content, stored data, etc. Moreover, the determining at step 400 can include predicting that the user (310) will need to access the data (312) from the second location (302). The method can predict the user's future location based on one or more factors and/or sources.

Non-limiting examples of factors and/or source include a schedule or calendar of the user (310), such as the user's email or business calendar; a previous travel pattern of the user (310), such as a travel history of the user; data retrieved from a social network, such as status updates from the user (310) or a user contact, comments on the user's social network page, comments posted by the user, links or uploads on the social network associated with the user (310), and/or any other activity in the social network from the user (310) or other users associated with the user (310); network preferences associated with the user; current and/or previous network or data usage patterns associated with the user (310); communications associated with the user (310), such as emails sent or received by the user (310), messages created by the user (310), requests generated by the user (e.g., help desk request to have access to the data (312) from the second location (302), a request to have long-distance communications enabled on the user's phone, etc.); one or more reservations or bookings associated with the user (310) (e.g., airplane tickets, auto rental bookings, hotel reservations, restaurant reservations, office or meeting room reservations, professional appointments, etc.); navigation or location systems, such as GPS systems, map or navigation software applications, location services or applications, location and movement of smartphone; and/or any information indicating that the user is traveling or will be traveling to the second location (302), such as information indicating that toll tickets or garage tickets have been purchased, credit card activity (e.g., purchases made to a company credit card), web browser history to indicate interest in different locations, etc.

At step 402, the method can include identifying a network node (162) which is capable of storing the data (312) and accessible by a computing device (116) from the second location (302). The network node can be identified based on the second location (302) (e.g., geographic location of the second location), any network(s) and/or access points available at the second location (302), available links at the second location, performance or security parameters and/or characteristics of nodes and/or links available at the second location, fog and/or cloud nodes (e.g., local or regional fog or cloud nodes) within a proximity of the second location (302) and/or capable of providing a threshold level of performance or security to devices connecting from the remote location (302), etc. Proximity can be physical/geographic, or logical based upon network topology.

The network node (162) can be selected from multiple candidate nodes identified for hosting the data (312). The network node can be selected from the multiple candidate nodes based on a respective proximity or geographic location, a respective performance or quality of connection/services, a respective connection cost, respective security conditions or capabilities, respective resource capabilities or requirements, etc.

The network node (162) can be a fog node (e.g., fog layer 156), a cloud node (e.g., regional cloud), a local node (e.g., a node within a same local area network, a node within a same private network, a node within a same geographic location, etc.), and so forth. In some cases, the network node (162) can be a local fog node or a regional cloud node.

At step 404, the method can include determining a first service parameter associated with a first network connection or link (316) between the computing device (116) and the first location (102) and, at step 406, determining a second service parameter associated with a second network connection or link (318) between the computing device (116) and the network node (116). The first and second service parameters can include data access performance parameters, such as jitter, latency, bandwidth, etc.; data or network access security parameters, such as encryption, security permissions, security policies, data protection procedures, security layers, etc.; costs, such as service or resource costs, bandwidth costs, routing costs, subscription costs, resource requirements or utilization, etc.; quality of service parameters; policies or preferences from specific organizations, and/or any other type of service or quality related parameters.

At step 408, when the second service parameter has a higher service parameter score than the first service parameter, the method can include migrating a portion of the data (312) from the first location (102) to the network node (162) prior to the second time (308). By migrating the portion of the data (312) to the network node (162), the method can allow the computing device (116) to access, at the second time (308), the portion of the data (312) from the second location (302) through the network node (162).

At step 408, the portion of the data (312) can be migrated to the network node (162), a network associated with the network node (162), and/or any location accessible via the network node (162). Moreover, to determine that the second service parameter has a higher service parameter score than the first service parameter, the first and second service parameters can be compared to determine which parameter(s) indicate a higher level of performance (e.g., lower latency, higher bandwidth, lower errors, higher uptime or availability, lower response times, lower number of hops, etc.), a higher level of quality of service, a higher level of security (e.g., encryption, access restrictions, security conditions and/or policies, firewall rules, security layers, security protocols, etc.), lower costs (e.g., lower resource consumption, lower subscription or service rates, lower resource requirements, etc.), closer physical or logical proximity to the second location (302) and/or preferable geographical location, and so forth.

In some cases, the method can also include determining a third time, which is after the first time (306) but prior to the second time (308), in which the user (310) will not need access to the data (312), and performing the migration at step 408 during the third time. The third time can be a downtime for the user. For example, the third time can be a period of time in which the user will be traveling, resting, dining, etc., and may not be accessing the data (312). To illustrate, the method can include predicting that the user (310) will not need access to the data (312) during the third time based on an estimated travel time between the first location (304) and the second location (302) where the travel mode does not facilitate network access. The estimated travel time can be determined based on a mode of travel (e.g., car, train, airplane, helicopter, skateboard, etc.), a travel distance (e.g., 10 miles, 100 miles, 1000 miles, etc.), a travel velocity (e.g., an average travel speed, a current travel speed, etc.), one or more estimated traveling conditions (e.g., traffic, delays, weather, etc.), a previous travel time (e.g., based on statistics or historical data, etc.) between the first location (304) and the second location (302), a number of travel segments or transportation modes (e.g., a car ride followed by an airplane ride followed by a train ride), published schedules, and so forth.

After identifying the third time, the method can include identifying a second network node(s) to migrate the data (312) to for allowing the user (310) to access the data (312) from that second network node(s). The second network node(s) can be identified based on a quality of connectivity to the second network node(s) from the location of the user (310) during the third time, an accessibility of the second network node(s) to the user (310) during the third time, a distance and/or proximity of the second network node(s) to the user (310) during the third time, etc. The quality of connectivity can be based on one or more parameters or characteristics of a connection or link between the second network node(s) and the user's device from a location of the user while the user (310) travels during the third time from the first location (304) to the second location (302). The one or more parameters or characteristics can define the performance of the service (e.g., latency, throughput or bandwidth, etc.), the security, the reliability, etc.

In some cases, the method can include determining that a method or path of travel between the first location (304) and the second location (302), identifying one or more network nodes, such as fog nodes (162) that will be accessible by the user while the user travels between the first location (304) and the second location (302), and selecting one or more of the identified nodes for migrating the data (312) to enable the user (310) to access the data (312) through those selected one or more nodes. The selected one or more nodes can be selected based on performance, distance or proximity, security, cost, etc. For example, the selected one or more nodes can be the closest, fastest, most secure, cheapest, and/or highest performing node(s) accessible to the user (310) from the user's location while the user (310) travels. If the user's vehicle (plane, train, ship, taxi, etc.) includes a mobile fog node, data (312) can be migrated onto it and ride along with the user for the best possible connectivity.

The disclosure now turns to FIGS. 5 and 6A-B, which illustrate example devices.

FIG. 5 illustrates an example network device 500 suitable for performing switching, port identification, and/or port verification operations. Network device 500 includes a master central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508 such as a processor from the Intel X86 family of microprocessors, the Motorola family of microprocessors or the MIPS family of microprocessors. In an alternative embodiment, processor 508 is specially designed hardware for controlling the operations of network device 500. In a specific embodiment, a memory 506 (such as non-volatile RAM, a TCAM, and/or ROM) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 504 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various dockers, containers and virtualized execution environments and data.

The network device 500 can also include an application-specific integrated circuit (ASIC) 512, which can be configured to perform routing and/or switching operations. The ASIC 512 can communicate with other components in the network device 500 via the bus 510, to exchange data and signals and coordinate various types of operations by the network device 500, such as routing, switching, and/or data storage operations, for example.

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a system bus computing system architecture 600 wherein the components of the system are in electrical communication with each other using a bus 606. Exemplary system 600 includes a processing unit (CPU or processor) 604 and a system bus 606 that couples various system components including the system memory 620, such as read only memory (ROM) 618 and random access memory (RAM) 616, to the processor 610. The system 600 can include a cache of high-speed memory connected directly with, in close proximity to, or integrated as part of the processor 610. The system 600 can copy data from the memory 620 and/or the storage device 608 to the cache 602 for quick access by the processor 604. In this way, the cache can provide a performance boost that avoids processor 604 delays while waiting for data. These and other modules can control or be configured to control the processor 604 to perform various actions. Other system memory 620 may be available for use as well. The memory 620 can include multiple different types of memory with different performance characteristics. The processor 604 can include any general purpose processor and a hardware module or software module, such as module 1 610, module 2 612, and module 3 614 stored in storage device 608, configured to control the processor 604 as well as a special-purpose processor where software instructions are incorporated into the actual processor design. The processor 604 may essentially be a completely self-contained computing system, containing multiple cores or processors, a bus, memory controller, cache, etc. A multi-core processor may be symmetric or asymmetric.

To enable user interaction with the computing device 600, an input device 622 can represent any number of input mechanisms, such as a microphone for speech, a touch-sensitive screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with the computing device 600. The communications interface 626 can generally govern and manage the user input and system output. There is no restriction on operating on any particular hardware arrangement and therefore the basic features here may easily be substituted for improved hardware or firmware arrangements as they are developed.

Storage device 608 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 616, read only memory (ROM) 618, and hybrids thereof.

The system 600 can include an integrated circuit 628, such as an application-specific integrated circuit (ASIC) configured to perform various operations. The integrated circuit 628 can be coupled with the bus 606 in order to communicate with other components in the system 600.

The storage device 608 can include software modules 610, 612, 614 for controlling the processor 604. Other hardware or software modules are contemplated. The storage device 608 can be connected to the system bus 606. In one aspect, a hardware module that performs a particular function can include the software component stored in a computer-readable medium in connection with the necessary hardware components, such as the processor 604, bus 606, output device 624, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 652, representative of any number of physically and/or logically distinct resources capable of executing software, firmware, and hardware configured to perform identified computations. Processor 652 can communicate with a chipset 660 that can control input to and output from processor 655. In this example, chipset 654 outputs information to output 662, such as a display, and can read and write information to storage device 664, which can include magnetic media, and solid state media, for example. Chipset 654 can also read data from and write data to RAM 666. A bridge 656 for interfacing with a variety of user interface components 658 can be provided for interfacing with chipset 654. Such user interface components 658 can include a keyboard, a microphone, touch detection and processing circuitry, a pointing device, such as a mouse, and so on. In general, inputs to system 650 can come from any of a variety of sources, machine generated and/or human generated.

Chipset 654 can also interface with one or more communication interfaces 660 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 654 analyzing data stored in storage 664 or 666 Further, the machine can receive inputs from a user via user interface components 658 and execute appropriate functions, such as browsing functions by interpreting these inputs using processor 652.

It can be appreciated that example systems 600 and 650 can have more than one processor 604/652 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

Further, as used herein, the terms "a portion of" an item or "at least part of" an item mean the entire item or anything less than the entire item but greater than zero. For example, claim language reciting "a portion of X" means the entire portion of X or any portion greater than zero but less than the entire portion of X. Similarly, claim language reciting "at least part of X" means the entirety of X or any part of X that is greater than zero and less than the entirety of X.

What is claimed is:

1. A method comprising:
predicting that a user, at a first user location, will need access to data stored at a first data location at a future time, from a second user location, the predicting based on a schedule or calendar associated with the user and data or network preferences associated with the user;
identifying a network node, at a second data location, capable of storing the data stored from the first data location and accessible by a computing device from the second user location;
comparing, prior to the future time, a performance quality of user access from the second user location to at least a portion of the data through the network node at the second data location with a performance quality of user access from the second user location to at least the portion of the data stored at the first data location to determine whether the performance quality of user access from the second user location to at least the portion of the data through the network node at the second data location is greater than the performance quality of user access from the second user location to at least the portion of the data stored at the first data location;
in response to the performance quality of user access from the second user location to at least the portion of the data through the network node at the second data location being greater than the performance quality of user access from the second user location to at least the portion of the data stored at the first data location, migrating at least the portion of the data from the first data location to the network node at the second data location prior to the future time and providing the computing device access to at least the portion of the data from the second user location through the network node; and
in response to the performance quality of user access from the second user location to the at least the portion of the data through the network node at the second data location being not greater than the performance quality of user access from the second user location to the at least the portion of the data stored at the first data location, providing the computer device access to at least the portion of the data stored at the first data location from the second user location.

2. The method of claim 1, further comprising:
determining a time prior to the future time in which the user will not need access to the data, the migrating of at least the portion of the data performed during the time.

3. The method of claim 2, wherein the determining of the time in which the user will not need access to the data includes predicting that the user will not need access to the data during the time based on an estimated travel time between the first user location and the second user location.

4. The method of claim 3, wherein the estimated travel time is determined based on at least one of a mode of travel, a travel distance, a travel velocity, or one or more estimated traveling conditions.

5. The method of claim 1, wherein the network node comprises at least one of a fog node residing in a fog layer of a fog computing architecture, or a cloud node residing in a cloud of a cloud computing architecture.

6. The method of claim 1, wherein the predicting is performed at a first time that the user will need the access to the data at a second time.

7. The method of claim 1, further comprising:
determining a period of time in which the user will be traveling from the first user location to the second user location;

identifying a second network node residing within at least one of a proximity of one or more locations where the user is estimated to be during the period of time in which the user will be traveling, a geographic area associated with the one or more locations where the user is estimated to be during the period of time in which the user will be traveling, or a logical network proximity associated with the one or more locations; and migrating at least the portion of the data to the second network node for access by the user during the period of time.

8. The method of claim 7, wherein the second network node comprises a fog node residing in a fog layer of a fog computing architecture.

9. The method of claim 8, wherein the fog node is identified based on at least one of a user location during the period of time, an estimated user location during at least part of the period of time, a travel mode of the user, a travel velocity of the user, an estimated travel path associated with the user, a proximity of the user to one or more other fog nodes in the fog layer, or a characteristic or topology of at least one of the fog layer or a wireless network accessible to the user during the period of time in which the user will be traveling.

10. The method of claim 9, further comprising:
migrating at least the portion of the data from the fog node to the network node based on at least one of a first determination that the user is within a first proximity to the second data location, or a second determination that the user is beyond a second proximity to the fog node;
wherein at least the portion of the data comprises one or more changes made to at least the portion of the data while at least the portion of the data was hosted by the fog node.

11. The method of claim 10, wherein,
the network node comprises a second fog node and a cloud node, and
the migrating of at least the portion of the data to the network node comprises one of:
migrating a first part of the portion of the data to the cloud node and a second part of the portion of the data to the second fog node, or
migrating at least the portion of the data to the cloud node and subsequently migrating, based on a determination that the user is closer to the second fog node than the cloud node, at least part of the portion of the data to the second fog node.

12. The method of claim 1, further comprising:
determining the user will need to access the data from the first user location; and
migrating at least the portion of the data from the network node back to the first data location.

13. A system comprising:
one or more processors; and
at least one computer-readable storage medium having stored therein instructions which, when executed by the one or more processors, cause the one or more processors to perform operations comprising:
predicting that a user, at a first user location, will need access to data stored at a first data location at a future time, from a second user location, the predicting based on a schedule or calendar associated with the user and data or network preferences associated with the user;

identifying a network node, at a second data location, capable of storing the data stored from the first data location and accessible by a computing device from the second user location;

comparing, prior to the future time, a performance quality of user access at the second user location to at least a portion of the data through the network node at the second data location with a performance quality of user access at the second user location to at least the portion of the data stored at the first data location to determine whether the performance quality of user access from the second user location to at least the portion of the data through the network node at the second data location is greater than the performance quality of user access from the second user location to at least the portion of the data stored at the first data location;

based on the comparison, if the performance quality of user access from the second user location to at least the portion of the data through the network node at the second data location is greater than the performance quality of user access from the second user location to at least the portion of the data stored at the first data location, migrating at least the portion of the data from the first data location to the network node at the second data location prior to the future time and providing the computing device access to at least the portion of the data from the second user location through the network node; and based on the comparison, if the performance quality of user access from the second user location to the at least the portion of the data through the network node at the second data location is not greater than the performance quality of user access from the second user location to the at least the portion of the data stored at the first data location, providing the computer device access to at least the portion of the data stored at the first data location from the second user location.

14. The system of claim 13, the operations include:
determining a downtime for the user in which the user will not need access to the data;
wherein the migrating of at least the portion of the data is performed during the downtime.

15. The system of claim 14, the operations include:
determining the user has traveled to a third user location that is beyond a threshold range of the network node; and
removing at least the portion of the data from the network node.

16. The system of claim 13, wherein the operations include:
determining a period of time in which the user will be traveling to the second user location;
identifying a second network node residing within at least one of a range of one or more locations where the user is estimated to be during the period of time in which the user will be traveling, a geographic area associated with the one or more locations where the user is estimated to be during the period of time in which the user will be traveling, or a logical network proximity associated with the one or more locations; and
migrating at least part of the portion of the data to the second network node for access by the user during the period of time;
wherein the second network node comprises a fog node residing in a fog layer of a fog computing architecture.

17. A non-transitory computer-readable storage medium having stored therein instructions which, when executed by a processor, cause the processor to perform operations comprising:
- predicting that a user, at a first user location, will need access to data stored at a first data location at a future time, from a second user location, the predicting based on a schedule or calendar associated with the user and data or network preferences associated with the user;
- identifying a network node, at a second data location, capable of storing the data stored from the first data location and accessible by a computing device from the second user location;
- comparing, prior to the future time, a performance quality of user access from the second user location to at least a portion of the data through the network node at the second data location with a performance quality of user access from the second user location to at least the portion of the data stored at the first data location to determine whether the performance quality of user access from the second user location to at least the portion of the data through the network node at the second data location is greater than the performance quality of user access from the second user location to at least the portion of the data stored at the first data location;
- based on the comparison, if the performance quality of user access from the second user location to at least the portion of the data through the network node at the second data location is greater than the performance quality f of user access rom the second user location to at least the portion of the data stored at the first data location, migrating at least the portion of the data from the first data location to the network node at the second data location prior to the future time and providing the computing device access to at least the portion of the data from the second user location through the network node; and
- based on the comparison, if the performance quality of user access from the second user location to the at least the portion of the data through the network node at the second data location is not greater than the performance quality of user access from the second user location to the at least the portion of the data stored at the first data location, providing the computer device access to at least the portion of the data stored at the first data location from the second user location.

18. The non-transitory computer-readable storage medium of claim 17, wherein the operations include:
- determining a period of time in which the user will be traveling to the second user location;
- identifying a second network node residing within at least one of a range of one or more locations where the user is estimated to be during the period of time in which the user will be traveling, or a geographic area associated with the one or more locations where the user is estimated to be during the period of time in which the user will be traveling; and
- migrating at least part of the portion of the data to the second network node for access by the user during the period of time.

19. The non-transitory computer-readable storage medium of claim 18, wherein,
- the second network node comprises a fog node residing in a fog layer of a fog computing architecture; and
- the fog node is identified based on at least one of:
  - a current user location;
  - an estimated user location during at least part of the period of time;
  - a travel mode of the user;
  - a travel velocity of the user;
  - an estimated travel path associated with the user;
  - a proximity of the user to one or more other fog nodes in the fog layer; or
  - a characteristic or topology of at least one of a wireless network accessible to the user during the period of time in which the user will be traveling, the fog layer, or the fog computing architecture.

20. The non-transitory computer-readable storage medium of claim 19, wherein,
- the operations include migrating, at the future time, at least the portion of the data from the fog node to the network node based on at least one of a first determination that the user is within a first proximity of the second data location, or a second determination that the user is beyond a second proximity of the fog node,
- the portion of the data includes one or more changes made to the at least part of the portion of the data while the at least part of the portion of the data was hosted by the fog node, and
- the network node includes a second fog node.

* * * * *